United States Patent
Ollila

(10) Patent No.: US 10,656,407 B2
(45) Date of Patent: May 19, 2020

(54) ELECTRONICALLY SWITCHING MICROLENSES BETWEEN OPTICAL STATES

(71) Applicant: Intel Corporation, Santa Clara, CA (US)

(72) Inventor: Mikko Ollila, Tampere (FI)

(73) Assignee: Intel Corporation, Santa Clara, CA (US)

( * ) Notice: Subject to any disclaimer, the term of this patent is extended or adjusted under 35 U.S.C. 154(b) by 812 days.

(21) Appl. No.: 15/198,108

(22) Filed: Jun. 30, 2016

(65) Prior Publication Data

US 2018/0003947 A1    Jan. 4, 2018

(51) Int. Cl.
*G02B 26/00* (2006.01)
*G02B 3/08* (2006.01)
*G02B 3/12* (2006.01)
*H04N 13/204* (2018.01)
*H04N 5/225* (2006.01)

(52) U.S. Cl.
CPC ............. *G02B 26/004* (2013.01); *G02B 3/12* (2013.01); *H04N 5/2254* (2013.01); *H04N 13/204* (2018.05); *G02B 3/08* (2013.01); *H04N 2213/001* (2013.01)

(58) Field of Classification Search
CPC .......... G02B 3/12; G02B 26/004; G02B 3/08; G02B 3/14; G02B 26/005; H04N 13/204; H04N 5/2254; H04N 5/2256

USPC .................................................. 359/665–667
See application file for complete search history.

(56) References Cited

U.S. PATENT DOCUMENTS

| | | | |
|---|---|---|---|
| 6,288,846 B1 * | 9/2001 | Stoner, Jr. ................ | G02B 1/06 351/159.68 |
| 2003/0085850 A1 * | 5/2003 | Feenstra .............. | G02B 26/005 345/32 |
| 2009/0225400 A1 * | 9/2009 | Ansems ................ | F21V 14/003 359/315 |
| 2012/0086949 A1 * | 4/2012 | Gao ..................... | G02B 26/001 356/521 |
| 2014/0085726 A1 * | 3/2014 | Portney ................. | G02C 7/085 359/571 |
| 2014/0204452 A1 * | 7/2014 | Branson ................ | G02B 26/02 359/290 |
| 2015/0029594 A1 * | 1/2015 | Chen ...................... | F24S 23/30 359/666 |
| 2015/0070474 A1 * | 3/2015 | Bhat .................... | H04N 13/232 348/49 |

* cited by examiner

*Primary Examiner* — Jordan M Schwartz
(74) *Attorney, Agent, or Firm* — International IP Law Group, P.L.L.C.

(57) ABSTRACT

An example electronic apparatus for switching microlenses includes a microlens including a plurality of microstructures to bend light. The electronic apparatus also includes a chamber coupled to the microlens to receive a liquid with an optical index that matches an optical index of the microlens. The electronic apparatus further includes an electronic device coupled to the chamber to manipulate the liquid to achieve a target optical state of the microlens.

16 Claims, 19 Drawing Sheets

900

ELECTRONICALLY SWITCHING MICROLENSES BETWEEN OPTICAL STATES

BACKGROUND ART

Cameras such as plenoptic cameras may use microlens arrays disposed in front of light sensors to capture light. A plenoptic camera, also known as light field camera, is a camera that captures information about a light field emanating from a scene, including the intensity of light in the scene and the direction that the light rays are traveling in space. Taking pictures with a plenoptic camera offers a different way to capture images. For example, the resulting captured images are not static, but allow the user to modify optical properties after the image has been recorded. For example, a user can interactively change the focus, the point of view, and perceived depth of field, all after having taken a photo. As adjustments may be performed computationally, these properties can be adjusted separately for each pixel. In addition, the raw image of a plenoptic camera also contains all the information needed to calculate the 3D form of a recorded scene. Thus, plenoptic cameras can also be considered 3D cameras.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
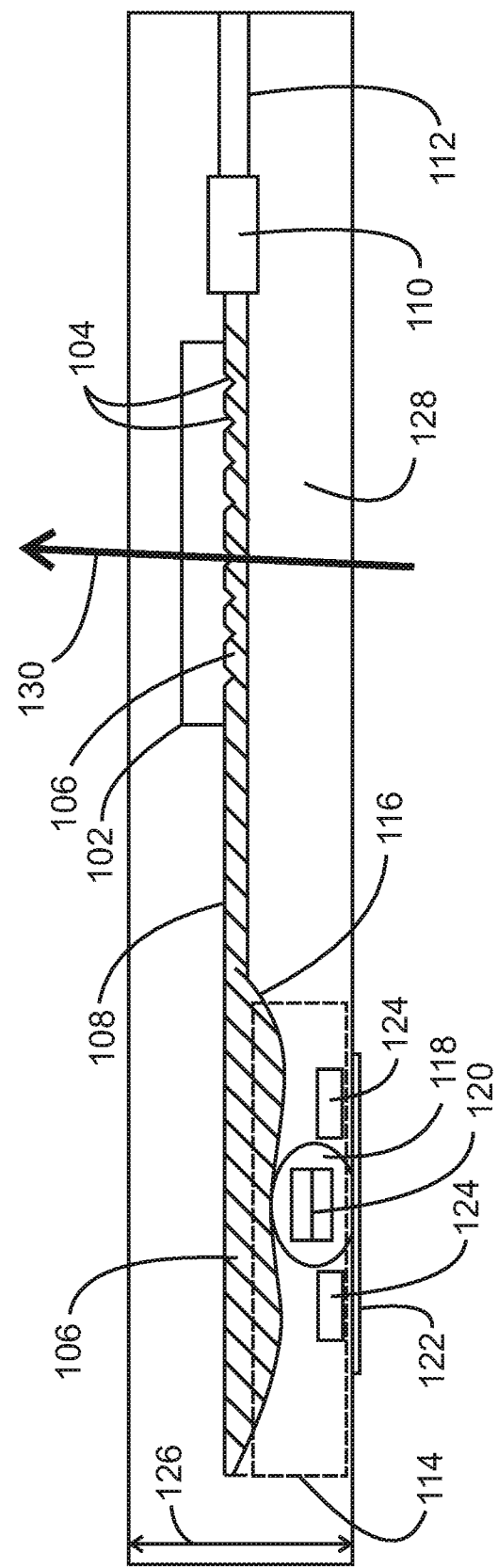
FIG. 1 is a cross section diagram illustrating an example microlens apparatus with a micropump using a magnet elevated in ferrofluid.

As discussed above, microlens arrays are also used in plenoptic cameras to achieve effects of Light Field Photography, which eliminates the need for initial focusing prior to capturing images. For example, in Light Field Photography, light field information such as light intensity and direction information can be captured and focus can be selected afterwards in software during post-processing. However, in order to capture the additional light field information, plenoptic cameras may make alternate use of the pixels in traditional sensors. Thus, a 13 megapixel sensor may produce low resolution pictures with an equivalent resolution of a one megapixel. Moreover, the sharpness of resulting images may also be poor. Processing images to fix resolution and sharpness issues is resource consuming in terms of both power and time consuming.

The present disclosure relates generally to techniques for electronically switching cameras between two optical states. For example, a single camera may operate in a plenoptic state with after-the-fact focusing or in a conventional state with higher resolution and sharpness. To enable the camera to operate in both states, the camera includes an electronic apparatus for switching microlenses. For example, the microlenses may include a number of microstructures to refract or diffract light. In some examples, the electronic apparatus may include an electronic device to manipulate a liquid. For example, the electronic device may be one or more micropumps. In some examples, the liquid may have an optical index that matches the optical index of the microlenses and may be received in a chamber beneath the microlenses. In some examples, a micropump can be an electromagnetic device including a magnet and ferrofluid. A ferrofluid, as used herein, refers to a colloidal liquid made of nanoscale ferromagnetic or ferrimagnetic particles suspended in a carrier fluid. For example, the carrier fluid may be an organic solvent or water. In some examples, the particles may be coated with a surfactant to inhibit clumping. For example, the surfactant may be oleic acid, tetramethyl ammonium hydroxide, citric acid, soy lecithin, or any other suitable surfactant. For example, the magnet may be move within the ferrofluid when the pump is activated and cause liquid to flow to the chamber beneath the microlenses. Alternatively, the magnet may be fixed and the ferrofluid may push against a stored liquid that may interact with the microlens to achieve a target optical state. For example, the target optical state may be a conventional optical state or a plenoptic state.

The switchable microlenses may also use an electrowetting of water to cover the microlenses with a liquid such as an oil and thereby prevent the refraction or diffraction of light associated with the microlenses as described below. For example, the oil may have an optical index matching the optical index of the microlenses, and thus be able to modify the optics of the microlenses accordingly. In some examples, the water may instead have an optical index matching the optical index of the microlenses resulting in a reversed effect when powered.

In some examples, the techniques herein may be applied to a flash lighting unit of an imaging device. For example, the flash light may be capable of operating in various states by disposing a switching lens in front of the flash light. For example, the flash light may be able to switch between a narrow flash and a wide flash state.

The techniques described herein enable a flexible and cost effective method of manufacturing small switchable optical elements in a thin and flexible form factor. In addition, the techniques enable microlenses to be electronically switched between two states. The number of parts used to manufacture such switchable microlenses is small and the mechanics of such microlenses are also robust and simple.

FIG. 1 a cross section diagram illustrating an example microlens apparatus with a micropump using a magnet elevated in ferrofluid. The example lens is referred to generally by the reference number 100. The example lens may be implemented in switching lens 1526 of the electronic device 1500 below.

The example microlens apparatus 100 includes a microlens 102 including a number of microstructures 104. In some examples, the microstructures 104 may be Fresnel structures of about 0.1-0.5 mm in scale. The Fresnel structures may be concentric annular sections capable of refracting light. These annular Fresnel structures or zones can also be made of diffractive optics of about 0.10 micrometers in scale. In some examples, the Fresnel structures may be in a molded or in a diffractive form. In some examples, the microlens 102 may be made of glass, plastic, or any other suitable optical material. In some example, the microlens 102 may be a single lens or an array of small lenses, also known as lenslets. As used herein, refracting refers to changing the direction of a propagation of light due to a change in transmission medium. The microlens apparatus 100 includes a liquid 106 in a chamber 108 that is directly beneath and in contact with the microstructures 104 of the microlens 102.

The microlens apparatus 100 includes a capillary pump 110 to the right of the chamber 106. The example microlens apparatus 100 includes a ventilation chamber 112 to the right of the capillary pump 110. The microlens apparatus 100 includes a first cavity 114 indicated by dashed lines that includes a reservoir 116 containing a liquid 106 coupled to the chamber 108 and a ferrofluid 118 surrounding a magnet 120 beneath the reservoir 116. In some examples, the reservoir 116 may be a flexible container such as a blister or pouch. For example, the reservoir 116 may be a blister or pouch made of silicon, rubber, elastomer, or any other suitable flexible material. The ferrofluid 118 and magnet 120 combination can provide a compression force to the reservoir 116 to enable liquid 106 to escape the reservoir 116 and enter the chamber 108.

The microlens apparatus 100 includes a coil 122 beneath the magnet 120 and ferrofluid 118 to regulate the compression of reservoir 116 via an electromagnetic interaction with the ferrofluid 118. The 114 further includes a pair of stoppers 124 to hold the magnet 120 and ferrofluid 118 in place horizontally. A dual-ended arrow 126 indicates a height of the example microlens apparatus 100. For example, the height 126 may be about 250 micrometers. The microlens apparatus 100 further includes a second cavity 128 that contains a second liquid. For example, the liquid may have an optical index equal to the optical index of the microlens 102. In some examples, the second liquid may be water. An arrow 130 indicates a ray of light passing through the example microlens apparatus 100.

In the example microlens apparatus 100, the force from a ferrofluid 118 causing the magnet 120 to levitate may be used to create a switching lens via the deposit and retraction of a liquid 106 beneath the microstructures 104 of the microlens 102. In the example of FIG. 1, the switching microlens apparatus 100 is in an unpowered state. For example, the coil 122 may have no current flowing through. Thus, the example microlens apparatus 100 may be said to be in an unpowered state. The ferrofluid 118 around the magnet 120 is pressing up against the reservoir 116 due to the magnetic attraction between the ferrofluid 118 and the magnet 120. In some examples, the magnetic attraction between the ferrofluid 118 and the magnet 120 may cause the magnet 120 to levitate and press against the reservoir 116. Thus, fluid 106 stored in the reservoir 116 may be pushed into the chamber 108 and beneath the microstructures 104 of the microlens 102. In some examples, the optical index of the liquid 106 may be the same as the optical index of the lens 102. Thus, no optical interface may exist between the lens 102 and the liquid 106, enabling the ray of light 126 to pass straight through the lens 102 and liquid 106 without any bending. The lens 102 and liquid 106 combination may therefore be said to operate similarly to a plane surface, such as a glass window, without any light bending capability.

In some examples, a current may be applied to the coil 122 and may cause the magnet 120 to move further towards the reservoir 116. For example, the coil 122 may cause an electric field that causes the ferrofluid 118 to build up underneath the magnet 120 and thus push the magnet 120 to move towards the reservoir 116. In some examples, the ferrofluid 118 may also naturally build up underneath the magnet 120 without any current applied to the coil 122. For example, the ferrofluid 118 may naturally form a ball around the magnet 120 and cause the magnet to be lifted and push against the reservoir 116.

Moreover, as described above, the microlens apparatus 100 may be a very thin structure. In some examples, the microlens may have diffractive structures or refractive microstructures. For example, the depth 126 of the microlens apparatus 100 may be about 250 micrometers. In some examples, the area of microlens 102 may be about 2×2 mm and thickness of the chamber 108 may be about 10 micrometers. In some examples, the lens 102 may be printed with a high accuracy replication process. For example, a mold may be pressed against a substrate, which is coated with an ultraviolet light (UV) curable material. After deformation and UV curing of the material, the mold may be separated and a replica of the mold may be formed. The volume of the liquid 106 may therefore be minimal. In some examples, airflow may be provided via a ventilation shaft 112. In some examples, a capillary structure 110 that may work in one direction may bring liquid 106 back before it escapes due to ventilation. In some examples, the ventilation shaft 112 and capillary structure 110 can be made very long, thus preventing any escaping of liquid 106. In some examples, the coil 122 may also be very thin. For example, the coil 122 may be evaporated on flexible or rigid plastic and have a thickness of about 20 micrometers. The flexible plastic may be created by a solvent embossing method, and thus be leak-free and capable of withstanding high pressures. In some examples, suitable structures may be included and treatments of channels may be performed so that air bubbles do not form in the liquid 106.

The diagram of FIG. 1 is not intended to indicate that the example microlens apparatus 100 is to include all of the components shown in FIG. 1. Rather, the example microlens apparatus 100 may have fewer or additional components not illustrated in FIG. 1 (e.g., additional microlenses, magnets, coils, fluids, microstructures, etc.).

Figure 2:
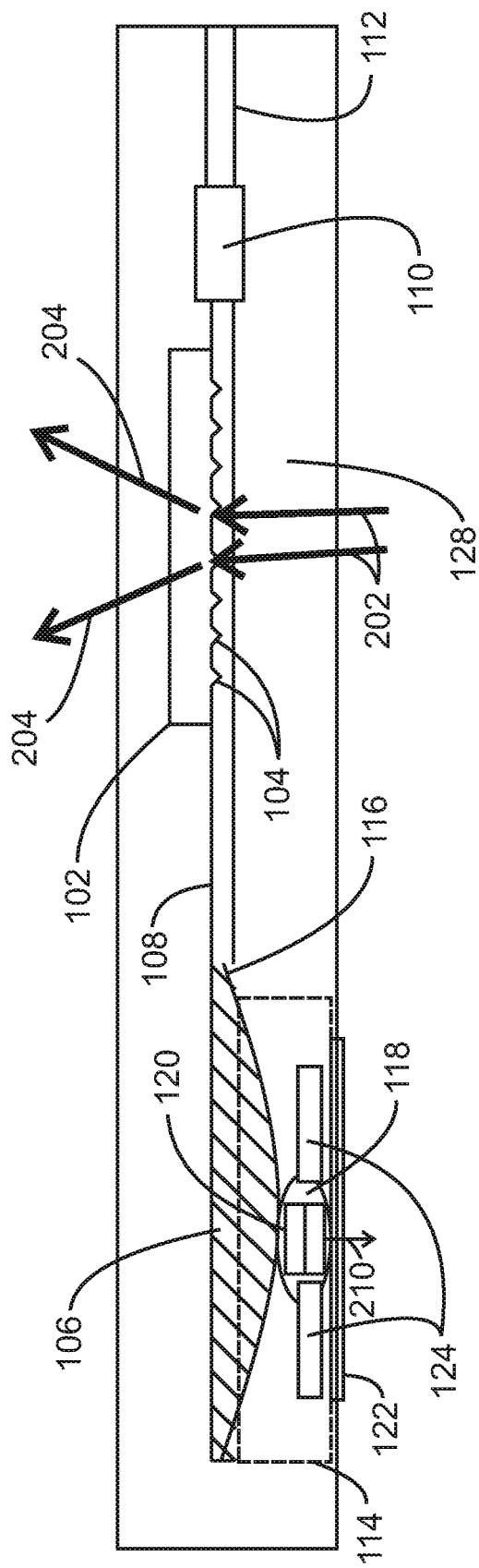
FIG. 2 is a cross section diagram illustrating an example microlens apparatus with a micropump using a magnet elevated in ferrofluid.

FIG. 2 is a cross section diagram illustrating an example microlens apparatus with a micropump using a magnet elevated in ferrofluid. The example microlens apparatus is referred to generally by the reference number 200 and can be implemented in the switching lens 1526 of the electronic device 1500 below.

The example microlens apparatus 200 includes similarly numbered elements from FIG. 1 above. In addition, the example microlens apparatus 200 includes an empty chamber 108. A set of incoming light rays 202 are refracted into light rays 204 by the microstructures 104 of the lens 102. In addition, a magnet 120 and ferrofluid 118 are held in place horizontally via a pair of stoppers 124.

As shown in FIG. 2, when voltage is applied to the coil 122, a magnetic field may be created that in combination with the magnetic field of magnet 120 can cause the magnet 120 to be pulled downwards towards the coil 122 as indicated by an arrow 210. In some examples, when a current is applied to the coil 122, the magnetic fields change so that ferrofluid 118 escapes from under magnet 120 and thus no push force of magnet 120 against the wall of the reservoir exists. The ferrofluid 118 accordingly travels to where an electromagnetic field gradient is strongest, which is no longer under the magnet 120. In some examples, the blister or reservoir may have mechanical tensions causing the reservoir to return the blister back to its original shape when the push force of the magnet 120 vanishes. For example, the magnetic fields may be similar to those depicted in FIG. 3A below. In some examples, any number of stoppers 208 may be used to prevent the magnet 120 from moving in a horizontal direction. The magnet 120 may thus drop, causing the reservoir 116 to reset back to a rest state. The reservoir 116 may accordingly provide suction that brings the liquid 106 back into the reservoir 116. The lens 102 may then have an air interface and thus an optical interface may exist as the optical index of the air and lens may differ. Thus, incoming light rays 202 are bent by the exposed microstructures 104 to produce outgoing light rays 204 at different angles. Therefore, the microlens apparatus 200 may be a very thin structure that is capable of switching between two modes of optical function. For example, one mode may be a plenoptic light field capture mode and the other mode may be a conventional image capture mode.

The diagram of FIG. 2 is not intended to indicate that the example microlens apparatus 200 is to include all of the components shown in FIG. 2. Rather, the example microlens apparatus 200 can be implemented using fewer or additional components not illustrated in FIG. 2 (e.g., additional microlenses, magnets, coils, fluids, microstructures, etc.).

Figure 3A:
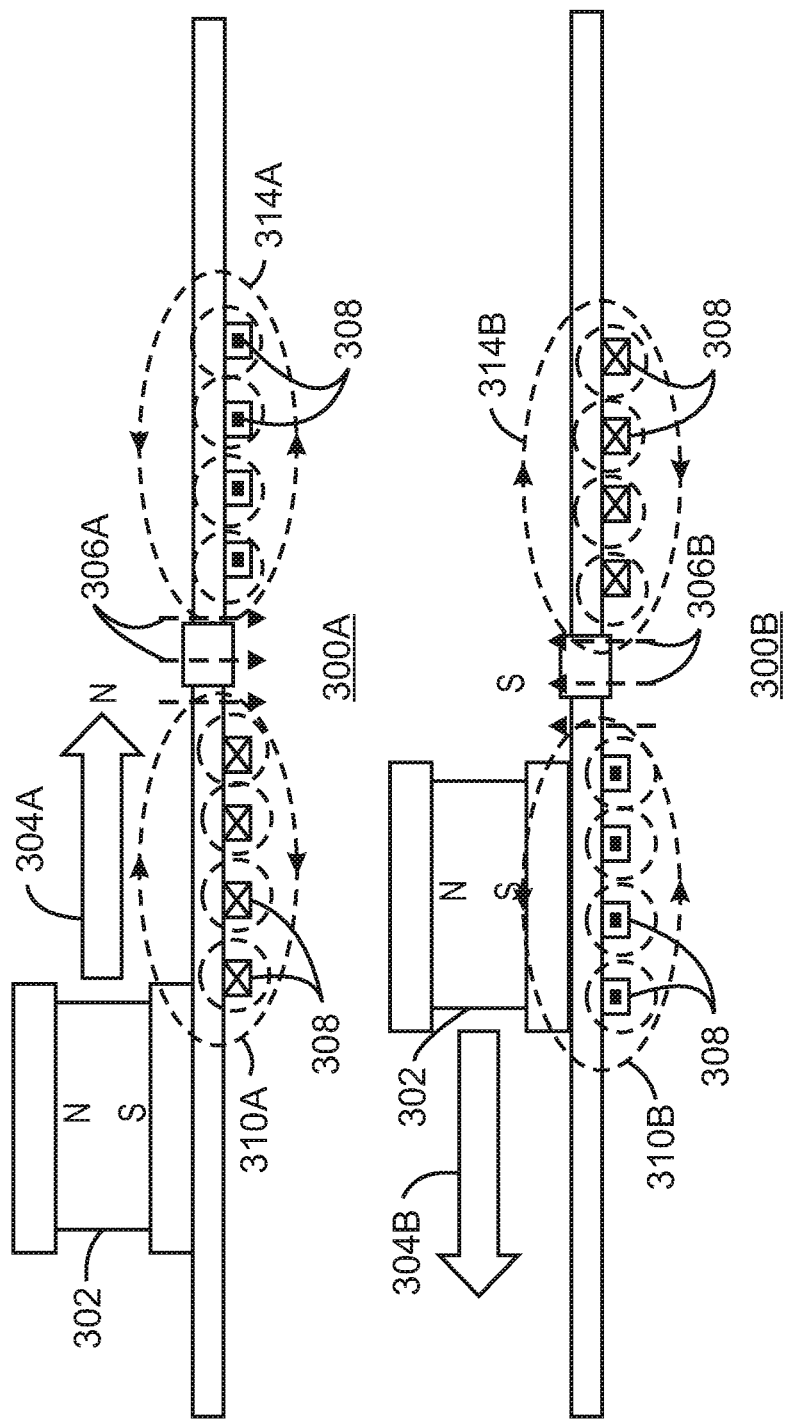
FIG. 3A is a cross section diagram of an example electromagnetic apparatus in attracting and repelling modes of actuation.

FIG. 3A is a cross section diagram of an example magnetic apparatus in attracting and repelling modes of actuation. The example magnetic apparatus in an attracting mode is generally referred to by the reference number 300A and the example magnetic apparatus in a repelling mode is generally referred to by the reference number 300B, and can be implemented in the switching lens 1526 of the electronic device 1500 below.

The magnetic apparatus 300 includes a magnet 302 moving in directions 304A and 304B. A first magnetic field 306A results from a combination of the current inside coil 308 and resulting magnetic field 310A on the left side of the coil 308 and the current in coil 308 resulting magnetic field 314A on the right side of the coil 308. A second magnetic field 306B results from a combination of an opposite current inside coil 308 and resulting magnetic field 310B on the left side of the coil 308 and the current in coil 308 and resulting magnetic field 314B.

As shown in FIG. 3A, the magnet 302 may be attracted or repelled via changes in the direction of current within the coil 308. For example, a south magnetic pole of the magnet 302 may be attracted to a north magnetic pole generated by the combination of magnetic fields 310A and 314A. Likewise, the south magnetic pole of the magnet 302 may be repelled by a south magnetic pole generated by the combination of magnetic fields 310B and 314B.

In some examples, the electromagnetic mechanism of FIG. 3A may be used to move a magnet or magnetic ferrofluid as described with respect to FIGS. 1-2 above and FIGS. 3C, and 4-6 below. For example, an electric current can be switched between the directions illustrated in coils 312 to move the magnet 302 and cause a micropump to displace a liquid under a microlens.

The diagram of FIG. 3A is not intended to indicate that the example magnetic apparatus is to include all of the components shown in FIG. 3A. Rather, the example magnetic apparatus may include fewer or additional components not illustrated in FIG. 3A (e.g., additional coils, magnets, etc.).

Figure 3B:
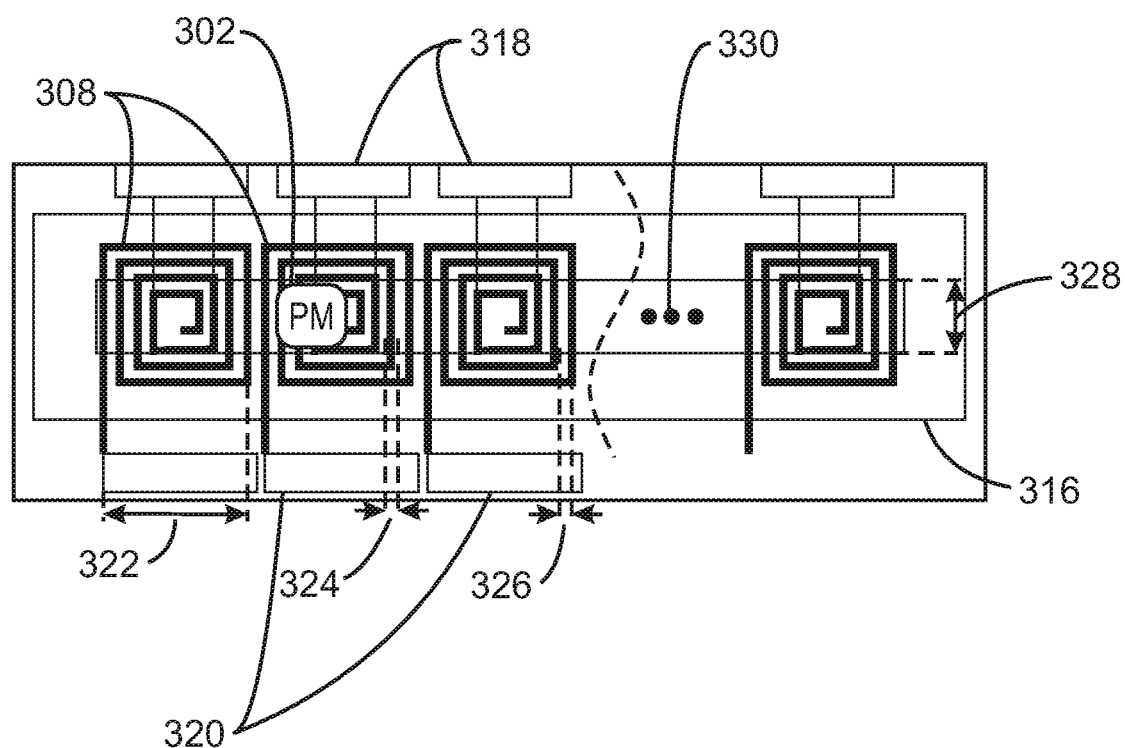
FIG. 3B is a top-down view of an example set of coils for displacing a magnet.

FIG. 3B is a top-down view of an example coil configuration for displacing a magnet (not shown). The example coil configuration can be implemented in the switching lens 1526 of the electronic device 1500 below.

The example coil configuration includes a set of coils 308 displaced beneath a linear guide 316 to guide a magnet. The example coil configuration further includes a first set of connection pads 318 coupled to the center of each of the coils 308. A second set of connection pads 320 is shown coupled to the other end of each coil 308. Each coil 308 also has a total width 322, an individual coil width 324, and a coil separation 326. For example, the total width 322 may be about 2.4 millimeters, the individual coil width may be about 100 micrometers, and the coil separation 326 may be about 150 micrometers. A width 328 of the opening of the linear guide 316 is indicated by a double-sided arrow. For example, the width 328 may be about 1.8 millimeters. An ellipsis 330 indicates additional coils 308 with coupled connection pads 318, 320. A magnet 302 is moving along the middle of the linear guide 316.

In the example coil configuration of FIG. 3B, a magnet can be displaced along the linear guide 316. The direction and speed that the magnet is displaced may be based on the amount and direction of current flowing in each of the coils 308. For example, a coil 308 with a current flowing in one direction may attract the magnet and a coil 308 with current flowing in the opposite direction may repel the magnet. Thus, a series of coordinated changes in the current flow of the individual coils 308 may be used to cause the magnet to slide back and forth across the linear guide 316. In this way, the magnet may be displaced from side to side under the reservoir, and pushing against the reservoir as discussed in greater detail with respect to FIG. 3C below.

The diagram of FIG. 3B is not intended to indicate that the example coil configuration is to include all of the components shown in FIG. 3B. Rather, the example coil configuration may include fewer or additional components not illustrated in FIG. 3B (e.g., additional coils, guides, connection pads, etc.).

Figure 3C:
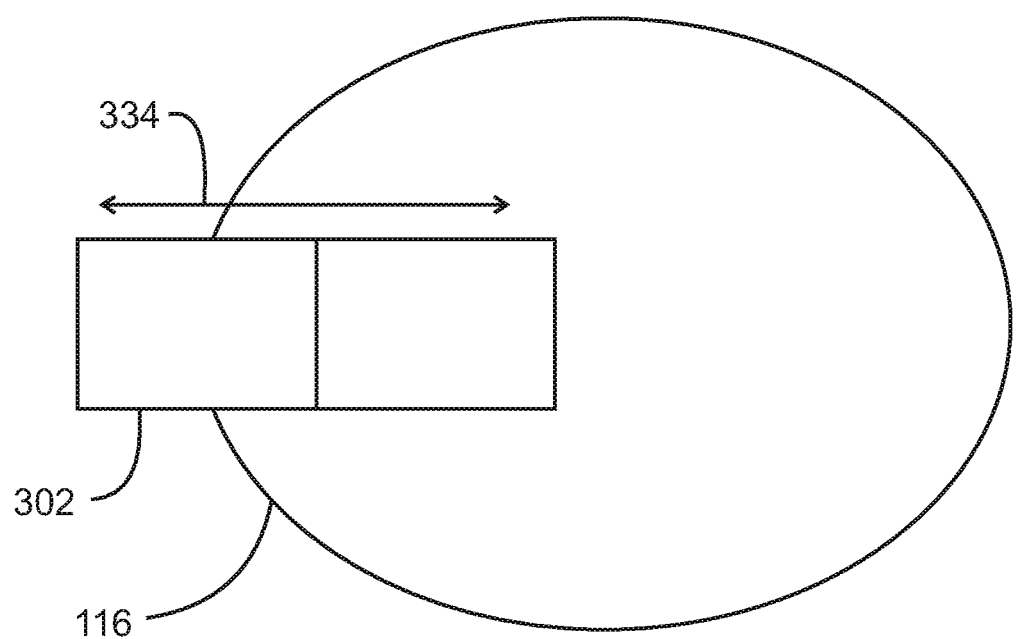
FIG. 3C is a bottom-up view of an example magnet being displaced horizontally under a reservoir.

FIG. 3C is a bottom-up view of an example magnet being displaced horizontally under a reservoir. The example magnet 302 can be implemented in the switching lens 1526 of the electronic device 1500 below.

In the example of FIG. 3C, the magnet 302 can move along a horizontal direction indicated by the double-sided arrow 334. For example, the magnet 302 may be moving along a linear guide as described above in FIG. 3B. In some examples, as the magnet 302 moves under the reservoir 116, it pushes against the reservoir 116, causing a liquid (not shown) within the reservoir 116 to be pushed out into a chamber (not shown). In some examples, the magnet may then move to a side of the reservoir 116, and the liquid may return into the reservoir 116 due to a resulting lower pressure at the reservoir 116.

The diagram of FIG. 3C is not intended to indicate that the example magnetic apparatus is to include all of the components shown in FIG. 3C. Rather, the example magnetic apparatus may include fewer or additional components not illustrated in FIG. 3C (e.g., additional coils, guides, connection pads, etc.).

Figure 4:
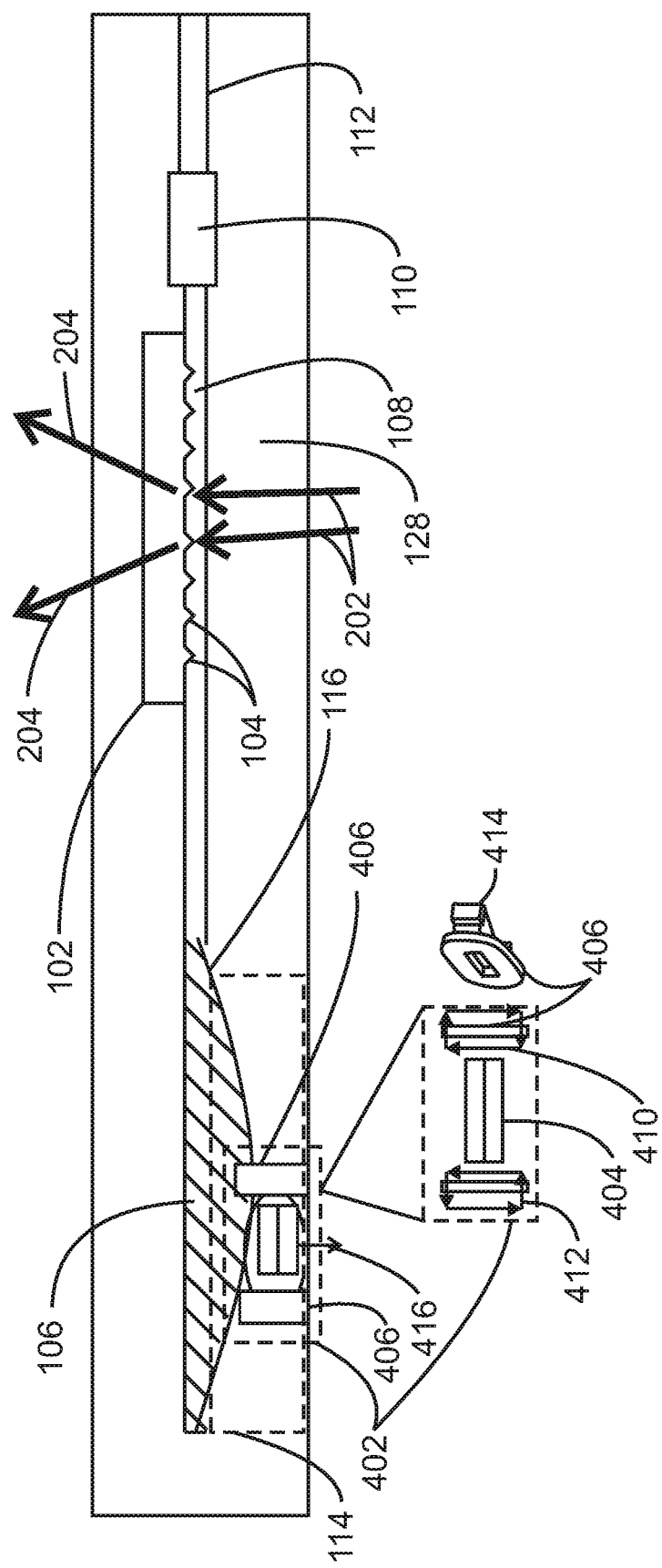
FIG. 4 is a cross section diagram illustrating an example microlens apparatus with a micropump including a magnet moved sideways in ferrofluid.

FIG. 4 is a cross section diagram illustrating an example microlens apparatus with a micropump including a magnet surrounded by side coils. The example microlens apparatus is generally referred to by the reference number 400. For example, the microlens apparatus can be implemented using the coils of FIGS. 3A-3B in the switching lens 1526 of the electronic device 1500 below.

The example microlens apparatus 400 is shown including similarly numbered elements from FIGS. 1 and 2 above. In addition, the example microlens apparatus 400 includes an electromagnetic apparatus 402 including a magnet 404 and one or more side coils 406. The side coils 406 produce magnetic fields 410, 412 when powered. The example microlens apparatus 400 may also include a feedback controller 414.

In the example microlens apparatus 400, the magnet 404 is moving downwards as indicated by an arrow 416. The magnet 404 may move in response to the magnetic forces generated by the side coils 406. The magnetic forces generated by the side coils 406 may be switched by alternating the current through the side coils 406 in different directions. The magnet 404 may be moved up and against the reservoir 116, or away from the reservoir 116 as shown in FIG. 4. Thus, in some examples, the reservoir 116 may be reset back to a rest state via suction by causing the magnet 404 to move down between the side coils 406. As the magnet 404 is moved down and away from the reservoir 116, the reservoir 116 may begin to fill with the fluid 106. The fluid 106 may thus be removed from beneath the lens 102, causing the lens 102 to generate refracted light 204 from incoming light 202 via the plurality of microstructures 104. In some examples, the feedback controller 414 coupled to the center of coil 410 can be used to detect position of the magnet 404 based on changes to magnetic fields 410, 412 and modify the current in the side coils 406 based on the detected position of the magnet 404 and a target position for the magnet 404. The feedback controller 414 may include a position sensor and a control logic or programmable core. For example, the position sensor may be a hall sensor or any other suitable sensor. In some examples, the programmable core may be any suitable microcontroller.

The diagram of FIG. 4 is not intended to indicate that the example microlens apparatus 400 is to include all of the components shown in FIG. 4. Rather, the example microlens apparatus 400 can be processed using fewer or additional components to produce effects not illustrated in FIG. 4 (e.g., additional microlenses, magnets, coils, fluids, microstructures, etc.). In some examples, the apparatus of FIG. 4 can be combined with the apparatus of FIGS. 1 and 2. For example, the magnet may be displaced using both ferrofluid and side coils.

Figure 5:
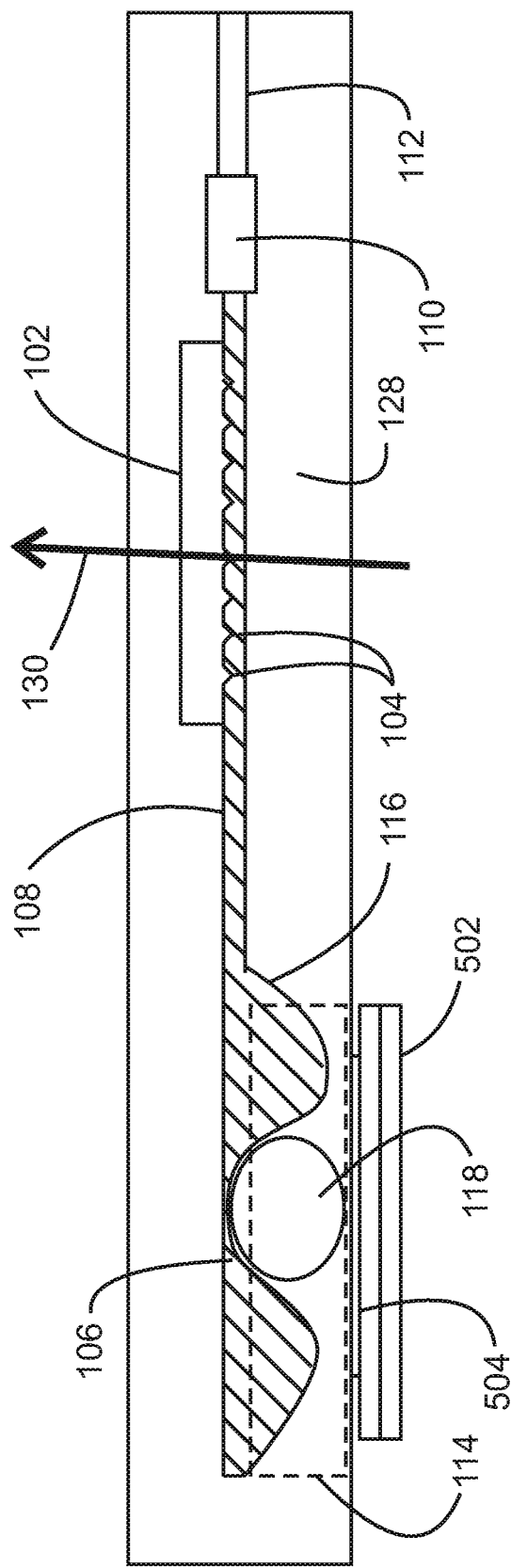
FIG. 5 is a cross section diagram illustrating an example microlens apparatus with an unpowered micropump including a fixed magnet.

FIG. 5 is a cross section diagram illustrating an example microlens apparatus with an unpowered micropump including a fixed magnet. The example microlens apparatus is generally referred to by the reference number 500 and can be implemented in the switching lens 1526 of the electronic device 1500 below.

The example microlens apparatus 500 includes similarly numbered elements from FIG. 1 above. The example microlens apparatus 500 further includes a fixed magnet 502 disposed beneath an inductor 504. For example, the inductor 504 may be an electromagnetic coil.

In the example channeling apparatus 500, a fixed magnet 502 can be disposed underneath of an inductor 504 and liquid 106 in reservoir 116. In an unpowered state, when no current flows through the inductor 504, the ferrofluid 118 compresses the reservoir 116. In some examples, the ferrofluid 106 may be contained within a container such as a pouch. For example, the container may be composed of the same material as the reservoir 116. In some examples, the compression of the reservoir 116 may cause the chamber 108 underneath of the microlens to fill with the liquid 106. In some examples, the microlens 102 may not be molded, but rather be a highly-accurately printed microlens. For example, the microstructures 104 of the microlens 102 may be about 10 micrometers in scale. Accordingly, a very small volume of liquid 106 may be used. In some examples, the liquid 106 may have the same optical index as the microlens 102. Thus, with a liquid 106 of the same optical index, no optical interface may exist between the liquid 106 and the microlens 102. Moreover, the effect of the microstructures may be cancelled. The microlens 102 may accordingly operate as a plane surface without light bending capability, allowing light 126 to pass through without being bent.

The diagram of FIG. 5 is not intended to indicate that the example microlens apparatus 500 is to include all of the components shown in FIG. 5. Rather, the example microlens apparatus 500 can be implemented using fewer or additional components not illustrated in FIG. 5 (e.g., additional microlenses, magnets, coils, fluids, microstructures, etc.).

Figure 6:
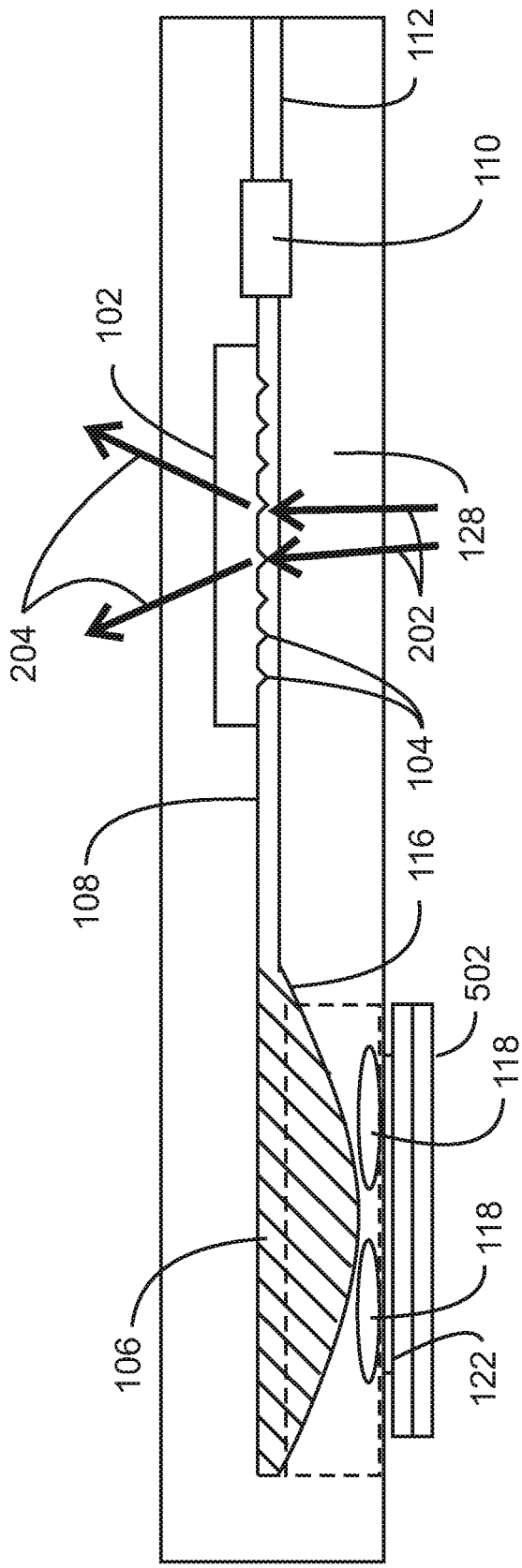
FIG. 6 is a cross section diagram illustrating an example microlens apparatus with a powered micropump including a fixed magnet.

FIG. 6 is a cross section diagram illustrating an example microlens apparatus with a powered micropump including a fixed magnet. The example microlens apparatus is generally referred to by the reference number 600 and can be implemented in the switching lens 1526 of the electronic device 1500 below.

The example microlens apparatus 600 includes similarly numbered elements from FIGS. 1, 2, and 5. However, the ferrofluid 118 is in the form of a ring.

In the example microlens apparatus 600, when a coil current is applied, the magnetic field is created such that the ferrofluid 118 recedes from the interface between the reservoir 116 and the coil 122 to the sides of the reservoir. The reservoir 116 may thus be released back to a rest state and thereby provide suction that brings the liquid 106 back from the chamber 108 and into the reservoir 116. For example, a membrane of the reservoir 116 may create a net negative pressure at the reservoir 116 when not being pressed by the ferrofluid 118. The microlens 102 may then have an air interface with the microstructures 104 and an optical interface may thus exist. Incoming light 202 is thus bent by the microstructures 104 to produce refracted or diffracted light 204.

The diagram of FIG. 6 is not intended to indicate that the example microlens apparatus 600 is to include all of the components shown in FIG. 6. Rather, the example microlens apparatus 600 can be implemented using fewer or additional components not illustrated in FIG. 6 (e.g., additional microlenses, magnets, coils, fluids, reservoirs, etc.).

Figure 7:
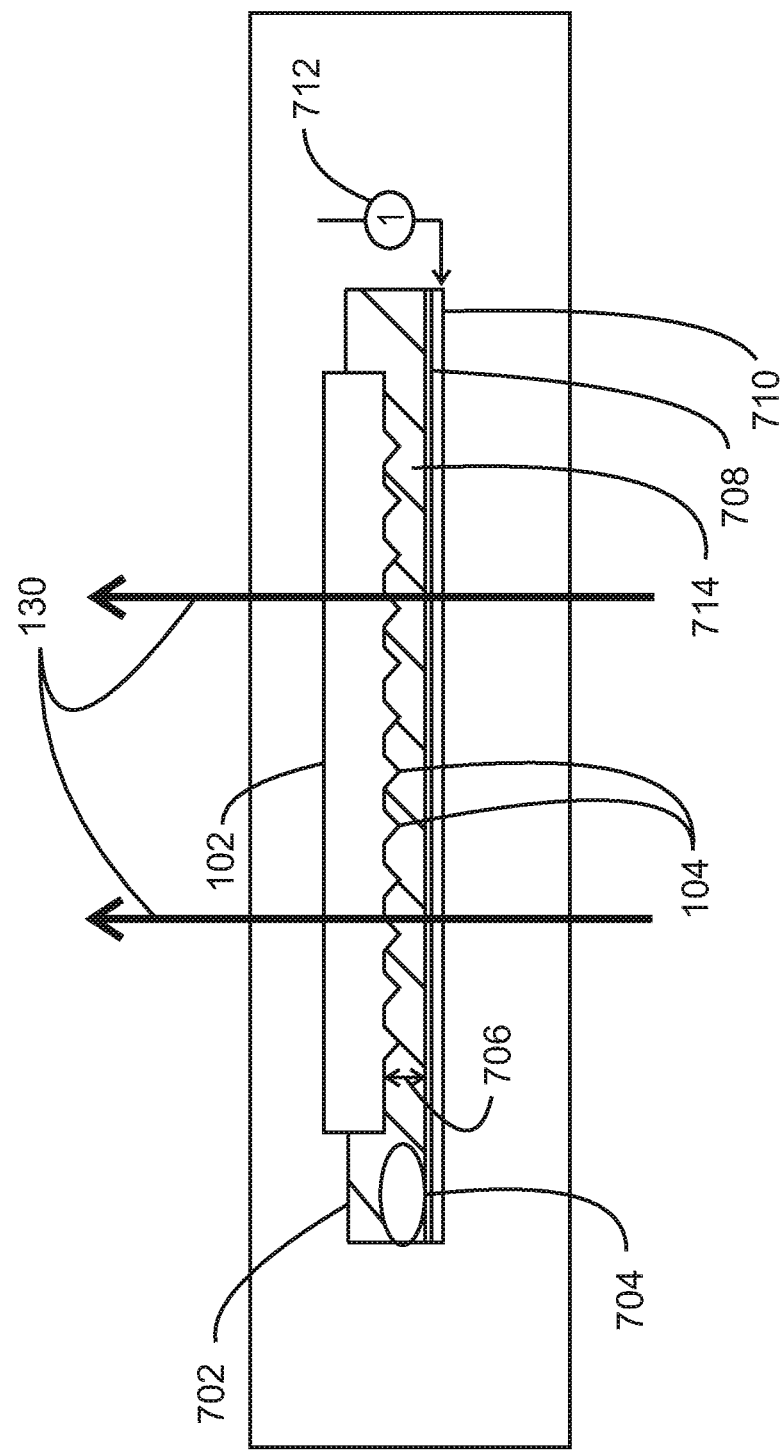
FIG. 7 is a cross section diagram illustrating an example powered electrowetting apparatus.

FIG. 7 is a cross section diagram illustrating an example powered electrowetting apparatus. The example microlens apparatus is generally referred to by the reference number 700 and can be implemented in the switching lens 1526 of the electronic device 1500 below.

The example microlens apparatus 700 includes similarly number elements from FIG. 1. A microlens 102 with microstructures 104 can pass light 130. The microlens apparatus 700 further includes a chamber 702 including oil 704. A clearance in chamber 702 is indicated by double sided arrow 706. For example, the clearance may be about 10-30 micrometers. The microlens apparatus 700 further includes a hydrophobic insulator 708 along the bottom of the chamber 702 to provide a hydrophobic surface. Hydrophobicity refers to the physical property of a molecule or material, also known as a hydrophobe, that is seemingly repelled from a mass of water due to an absence of attractive force. Water on hydrophobic surfaces may exhibit a high contact angle. A contact angle is an angle, conventionally measured through the liquid, where a liquid-vapor interface meets a solid surface. A contact angle can also be used to quantify the wettability of a solid surface by a liquid via the Young equation. The microlens apparatus 700 may include a transparent electrode 710 beneath the hydrophobic insulator 708 to apply a voltage difference across the hydrophobic insulator 708 in response to a voltage 712 being applied to the transparent electrode 710 as indicated by a "1." The microlens apparatus 700 further includes water 714, which is indicated by diagonal shading.

In the example microlens apparatus 700, the chamber 702 underneath of the microlens 102 is filled with water 714. For example, the microlens 102 may be a Fresnel lens with an optical index that matches the optical index of the water 714. The chamber 702 further includes a transparent oil 704 with an optical index that differs from the optical index of the microlens 102. As discussed above, the microlens 102 may be a highly accurate printed microlens, rather than molded microlens. Thus, the microstructures 104 may be in 10 micrometers in scale, rather than a conventional plastic molded lens which may have a microstructure height of 0.1-0.5 mm. In some examples, the microlens 102 may also be a lens made of diffractive features of about 10 micrometers in height.

As shown in FIG. 7, electrowetting may be used to modify the wetting properties of the hydrophobic insulator 708. For example, when water droplet is placed on hydrophobic surface the water minimizes any contact area with the hydrophobic surface. The hydrophobic interaction may be an entropic effect originating from the disruption of the highly dynamic hydrogen bonds between molecules of the water 704 by the nonpolar solute forming a clathrate-like structure around non-polar molecules. This structure formed is more highly ordered than free water molecules due to the water molecules arranging themselves to interact as much as possible with themselves, and thus results in a higher entropic state which causes non-polar molecules to clump together to reduce the surface area exposed to water and decrease the entropy of the system. Thus, the two immiscible phases (hydrophilic vs. hydrophobic) may change so that their corresponding interfacial area will be minimal. However, if a voltage difference is applied between an electrode in the water droplet and a subsurface electrode present underneath of the hydrophobic insulator, then as a result of the voltage, the droplet spreads. In other words, the wettability of the hydrophobic surface may increase strongly. Thus, when a voltage 712 is applied to the transparent electrode 710, the transparent electrode 710 can apply a voltage difference across the hydrophobic insulator 708. As the voltage difference is applied across the hydrophobic insulator 708, an electrostatic term may be added to the energy balance and a stacked state may no longer energetically favorable. The system can accordingly lower its energy by moving the water 714 into contact with the hydrophobic insulator 708 and an electrostatic term is thus added to the energy balance. The system can lower its energy by moving the water into contact with the insulator and push the oil 704 aside. In some examples, a hydrophobic effect may also be responsible for the separation of the mixture of oil 704 and water 714 into its two components.

In some examples, the interface may thus be filled with water 714. As the optical index of the microlens 102 and water 714 matches, no optical interface exists. Thus, the microlens 102 may operate as a transparent plane surface without any light bending. By applying the voltage and removing the voltage as discussed with respect to FIG. 8 below, a switching microlens 102 can thus be created.

The diagram of FIG. 7 is not intended to indicate that the example microlens apparatus 700 is to include all of the components shown in FIG. 7. Rather, the example microlens apparatus 700 can be implemented using fewer or additional components not illustrated in FIG. 7 (e.g., additional microlenses, magnets, coils, fluids, microstructures, etc.). In addition, although the optical index of the microlens 102 matches the optical index of water 714 in the example, in some examples the optical index of the microlens 102 may instead match the optical index of the oil 704, with a nonmatching optical index for the water 714. An opposite polarity for on-off states of the switching microlens apparatus 700 may thus be provided. For example, applying voltage 712 may then result in bending of incoming light.

Figure 8:
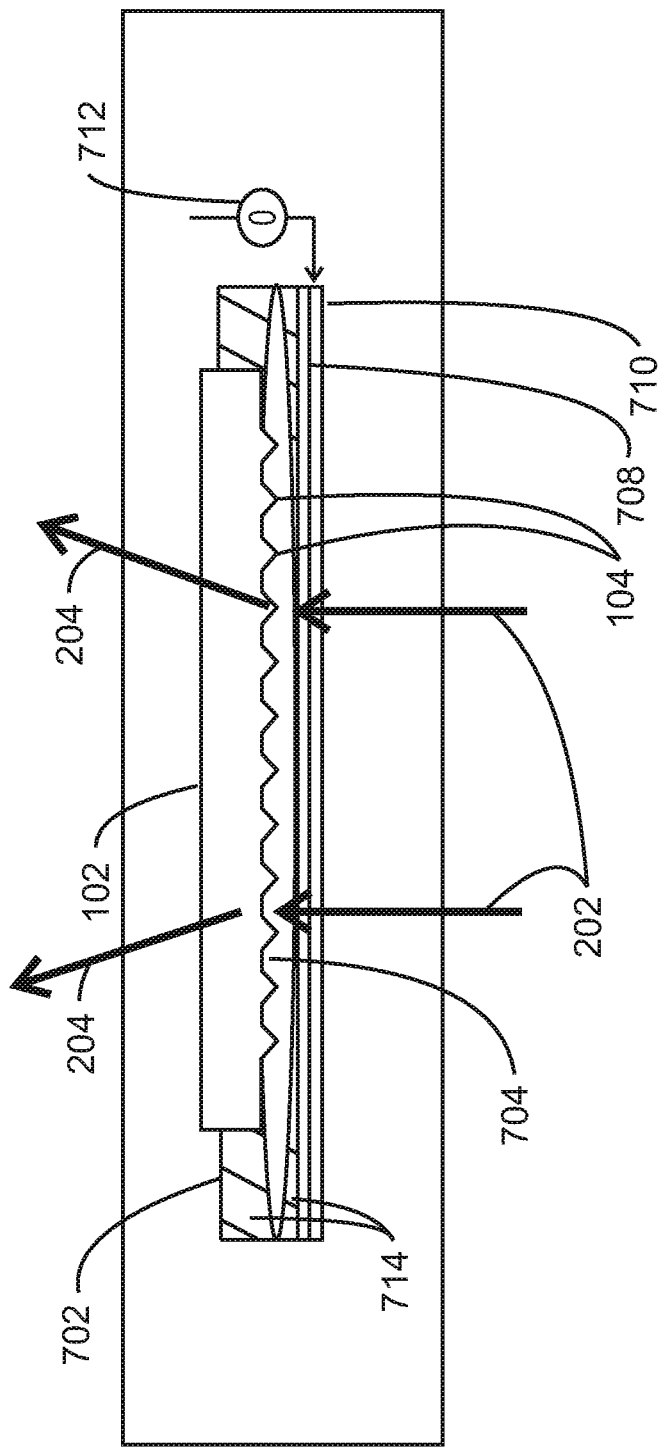
FIG. 8 is a cross section diagram illustrating an example unpowered electrowetting apparatus.

FIG. 8 is a cross section diagram illustrating an example unpowered electrowetting apparatus. The example microlens apparatus is generally referred to by the reference number 800 and can be implemented in the switching lens 1526 of the electronic device 1500 below.

The example microlens apparatus 800 includes similarly numbered elements from FIGS. 1, 2, and 7. For example, a microlens 102 is bending incoming light 204 to produce refracted or diffracted light 206. The microlens apparatus 800 further includes a chamber 702 with oil 204 disposed in the interface between the microlens 102 and the hydrophobic insulator 708. The transparent electrode 710 is unpowered by any voltage 712 as indicated by a "0".

As shown in FIG. 8, as the water tries to minimize contact surface with hydrophobic insulator 708, the oil 704 may naturally form a continuous film between the water 714 and the hydrophobic insulator 708. In some examples, this may be the lowest energy state of system and the voltage may be zero. A balance between electrostatic and surface tension forces may determine how far the oil 704 is moved in or out of the interface portion of the chamber 702. For example, due to the small scale of the surface tension of the oil 704 may be more than 1,000 times stronger than the gravitational force. Thus, the oil 704 may be stable in all orientations. As a result of the oil 704 moving into the interface beneath the microlens 102, the microlens 102 may have an optical interface as the optical index of the oil and the optical index of the microlens 102 differ. Thus, the light 204 is bent to generate light 206 with a different angle due to the microstructures (not shown) of the microlens 102.

The diagram of FIG. 8 is not intended to indicate that the example microlens apparatus 800 is to include all of the components shown in FIG. 8. Rather, the example microlens apparatus 800 can be implemented using fewer or additional components not illustrated in FIG. 8 (e.g., additional microlenses, magnets, coils, fluids, microstructures, etc.).

Figure 9:
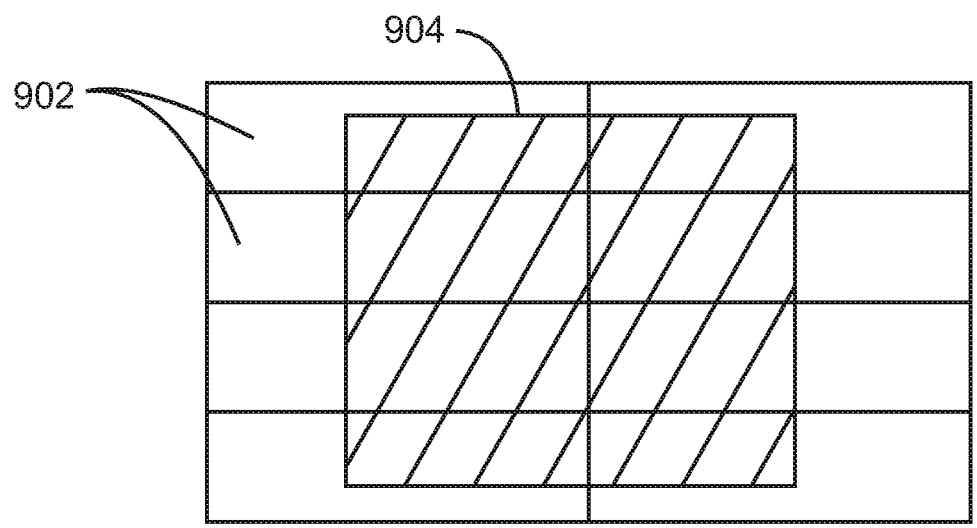
FIG. 9 is a top down diagram illustrating an example microlens with multiple chambers.

FIG. 9 is a top view of an example microlens apparatus with multiple chambers. The example microlens apparatus is generally referred to by the reference number 900 and can be implemented in the switching lens 1526 of the electronic device 1500 below.

The example microlens apparatus 900 includes a plurality of chambers or cells 902. The example microlens apparatus 900 further includes a microlens 904 disposed above the chambers 902.

In the example microlens apparatus 900, several small cells 902 are disposed under the microlens 904. For example, one large 2×2 mm cell may not be possible in some designs. Therefore, 1×0.5 mm cells 902 or smaller may be used instead. In some examples, the use of multiple smaller cells 902 may also enable improved wetting. For example, if a large Fresnel lens is made based on plastic molded Fresnel zones, the feature heights may be about 0.1-0.5 mm. It may not be easy to cover those with liquids for an on-off state. Thus, one large lens may be made based on smaller cells 902 that have smaller feature sizes resulting in faster and more reliable and complete wetting. In addition, each cell 902 can be individually controlled and thus tuned. For example, in the case of a photo using flash light, then the uniformity of the artificially lighted scene can be spatially changed or corrected. In some examples, the Fresnel zones may alternatively be formed with diffractive optics that are just 10 micrometers deep.

The diagram of FIG. 9 is not intended to indicate that the example microlens apparatus 900 is to include all of the components shown in FIG. 9. Rather, the example microlens apparatus 900 can be implemented using fewer or additional components not illustrated in FIG. 9 (e.g., additional microlenses, magnets, coils, fluids, microstructures, etc.).

Figure 10:
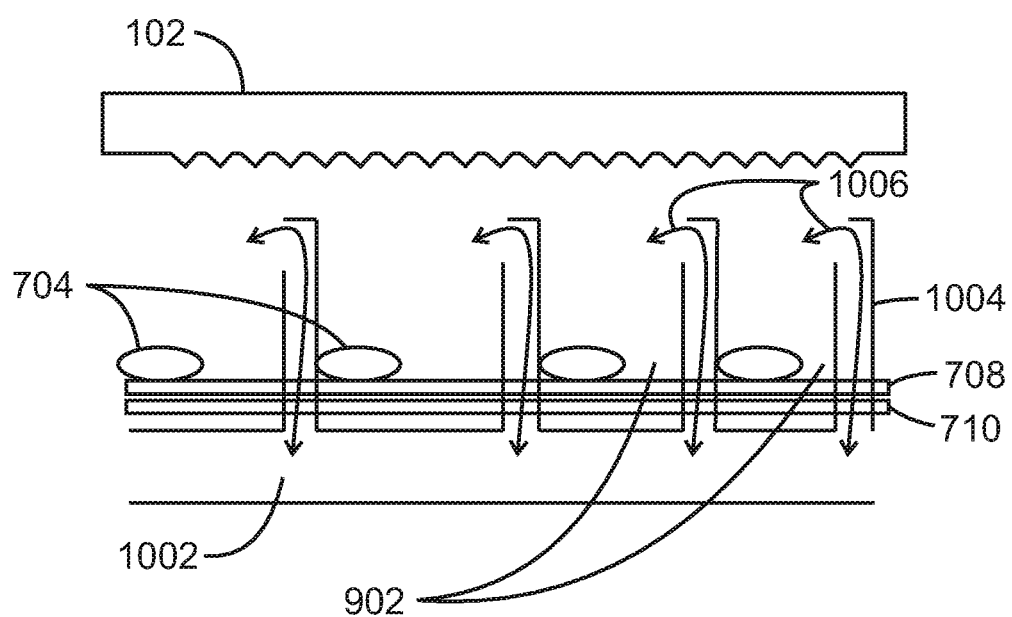
FIG. 10 is a cross section diagram illustrating an example microlens with multiple chambers.

FIG. 10 is a cross section diagram illustrating an example microlens apparatus with multiple chambers. The example microlens apparatus is generally referred to by the reference number 1000 and can be implemented in the switching lens 1526 of the electronic device 1500 below. For example, the microlens apparatus 1000 may be a cross sectional view of the microlens apparatus 900.

The example microlens apparatus 1000 includes a water reservoir 1002 beneath cells 902 and connected to a number of cell walls with microchannels 1004. The microlens apparatus 1000 further includes a microlens 102, oil 704, hydrophobic insulator 708, and a transparent electrode 710.

In the example microlens apparatus 1000, the microlens apparatus may include one or more water microchannels 1004 inside of cell walls between small cells 902 to allow water to freely flow and equalize pressure. In some examples, the water reservoir 1002 may be at the bottom of the structure 1000 as all features may be transparent. The reservoir 1002 may thus have the same optical effects as a plain plate without any light-bending surfaces. As indicated by the arrows 1006, water can then flow in both directions through the microchannels 1004 when the oil 704 either is replaced or escapes. In some examples, pressure may be provided to the water. In some examples, thin walls may be used for the microchannels 1004. Thus, the microchannels may not affect the microlens operation as much as molded optics.

In the example microlens apparatus 1000, the oil 704 is balled and to the side because the transparent electrode 710 is not powered. For example, any incoming light is therefore not affected by the oil 704. In some examples, a smallest entropy may be when the water and hydrophobic surface has smallest common surface and the voltage applied to the transparent electrode 710 is zero. For example, electrowetting may be applied to the hydrophobic surface 708. Electrowetting the hydrophobic surface 708 may modify the wetting properties of the hydrophobic surface 708 via an electric field applied by the transparent electrode 710. The oil 704 may accordingly cover more area of the hydrophobic surface 708 and may thereby cause the optical interface of the microlens 102 to be turned off. Thus, the light may travel through the oil covered portion of the microlens without being bent.

The diagram of FIG. 10 is not intended to indicate that the example microlens apparatus 1000 is to include all of the components shown in FIG. 10. Rather, the example microlens apparatus 1000 can be implemented using fewer or additional components not illustrated in FIG. 10 (e.g., additional chambers, microchannels, fluids, lenses, etc.).

Figure 11:
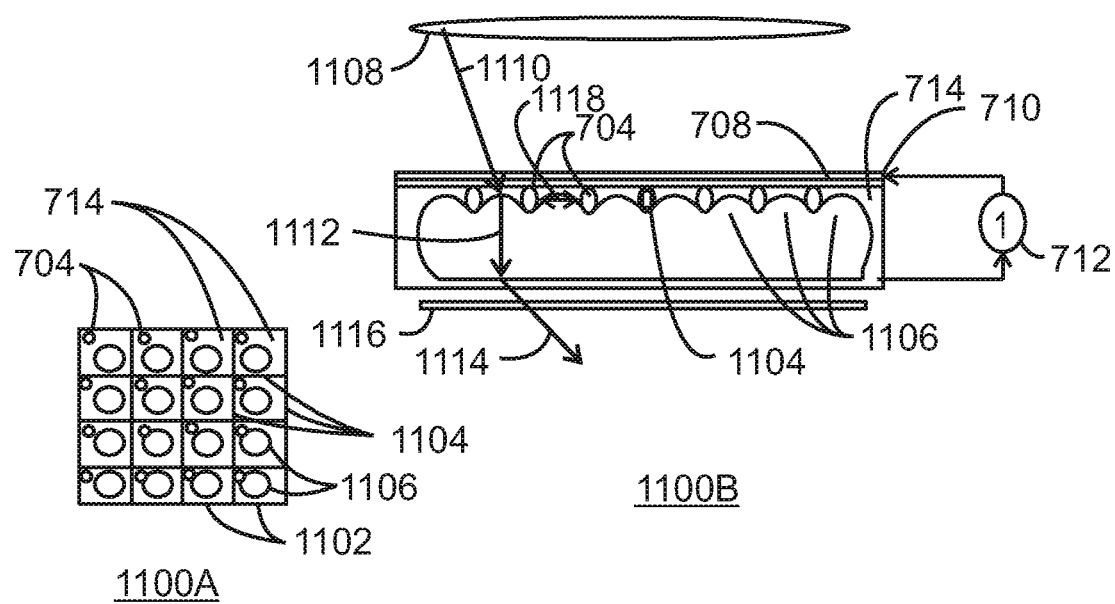
FIG. 11 is a top down view and cross section diagram illustrating an example microlens array with an electrowetting apparatus.

FIG. 11 is a top view and cross section diagram illustrating an example microlens array with an electrowetting apparatus. The example microlens array is generally referred to by the reference numbers 1100A and 1100B and can be implemented in the switching lens 1526 of the electronic device 1500 below.

The example microlens array 1100A includes a lens array with a number of cells 1102 separated by cell walls 1104. Each cell 1102 contains an oil 704, water 714, and a microlens 1106.

The example microlens array 1100B includes similarly numbered elements discussed above in FIGS. 1 and 7. The microlens array 1100 also includes a main lens 1108 to guide a light beam 1110 that then passes through a microlens 1106 without changing direction. As the light beam passes through the microlens 1106, the light slows down traveling through a first portion 1112 of the microlens 1106, and exits at a similar direction 1114 exiting the microlens 1106 and then passing through the sensor 1116. An aperture 1118 one of the microlenses is indicated by a double-sided arrow. For example, the aperture 1118 may be a center portion of the microlens 1106.

In the example microlens array 1100, a microlens 1106 is switchable via an electrowetting apparatus. For example, the microlens 1106 may be a plenoptic lens used for plenoptical photography. In some examples, the transparent oil 704 may have a matching optical index with the microlens 1106. By contrast, the optical index of lens and the optical index of the water 714 may differ. In some examples, when a voltage 712 is applied, the oil 704 may escape from interface and the interface is filled with water 714. Thus, as the optical index of the microlens and water do not matches, an optical interface exists causing the light to bend. Therefore, light may be bent by the microstructures of microlens 1106. In some examples, an on-off plenoptics lens may thus be created.

In some examples, the microlenses 1106 may have very small dimensions. For example, the microlenses 1106 may be less than 100 micrometers in size. In some examples, the microlenses 1106 may have own aperture and focal length different from main lens and the fill factor may be low. Therefore, an empty or non-active area may exist for the electrowetting apparatus.

The diagram of FIG. 11 is not intended to indicate that the example microlens array 1100 is to include all of the components shown in FIG. 11. Rather, the example microlens array 1100 can be implemented using fewer or additional components not illustrated in FIG. 11 (e.g., additional mirrors, slots, reflections, light sources, etc.). Alternatively, the optical index of the water may match the optical index of the microlens 1106 and the optical index of the oil 704 may not match the optical index of the microlens 1106. In this case, an opposite polarity of on-off states is provided, wherein when a voltage is applied, an optical interface does not exist and the light is not bent.

Figure 12:
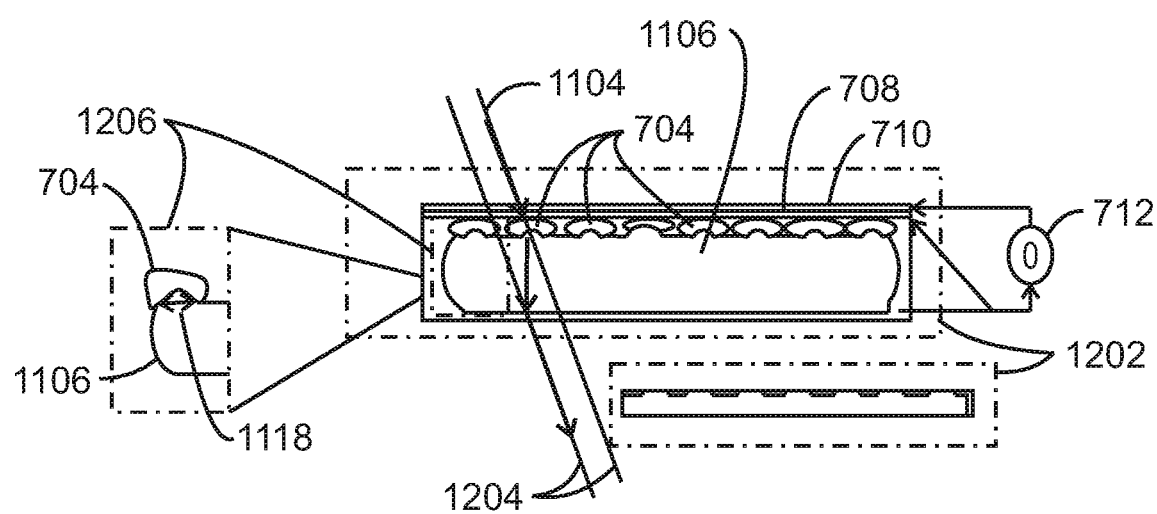
FIG. 12 is a cross section diagram illustrating an example unpowered microlens array with an electrowetting apparatus.

FIG. 12 is a cross section diagram illustrating an example unpowered microlens array with an electrowetting apparatus. The example microlens array is generally referred to by the reference number 1200 and can be implemented in the switching lens 1526 of the electronic device 1500 below.

The example microlens array 1200 includes the similarly numbered elements of FIG. 11 above. In addition, the microlens array is expected to function as a plain glass surface 1202 that does not bend light 1104 as shown by parallel lines 1204. A disabled microlens 1206 includes a microlens 1106 covered with oil 704.

In the example of FIG. 12, as no voltage 712 is applied to the transparent electrode 710, the oil 704 fills the interface between microlens 1106 and the hydrophobic insulator 708. In some example, the oil 704 may spread enough to cover the apertures 1118 of the microlenses 1106. The microlens 1106 may have optical interface as the optical index of the oil 704. Thus, the microlens array 1200 may operate as plane surface 1202 without light bending.

In some examples, the pitch of microlenses 1106 in the array 1200 may be about 500 micrometers and the microlens aperture may be about 200 micrometers. The microlens fill factor may therefore be about 50% of the total area, thus there may be enough space for electrowetting systems structures and features such as walls and wirings (not shown). Moreover, the electrowetting structures may be added without any reduction in the resolution of optics. In some examples, various lens sizes may be used depending on design, resolution and optical format and pixel size.

The diagram of FIG. 12 is not intended to indicate that the example apparatus 1200 is to include all of the components shown in FIG. 12. Rather, the example apparatus 1200 can be implemented using fewer or additional components not illustrated in FIG. 12 (e.g., additional mirrors, slots, reflections, light sources, etc.).

Figure 13:
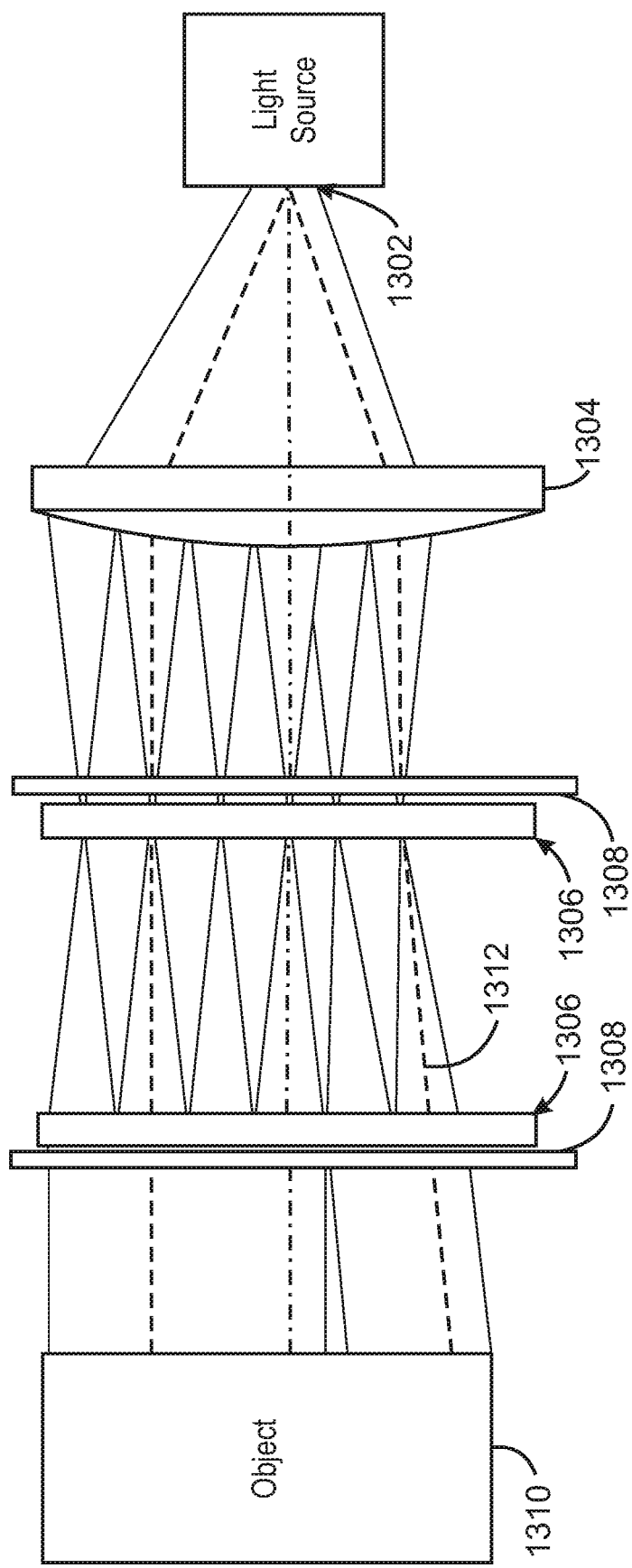
FIG. 13 is a flash with multiple switching lenses for illuminating an object.

FIG. 13 is an optical device with multiple switching lenses for illuminating an object. The example optical device is generally referred to by the reference number 1300 and can be implemented in the switching flash light 1528 of the electronic device 1500 below. In some examples, the optical device may be a projector.

The example optical device 1300 includes a light source 1302. For example, the light source 1302 can be a light emitting diode (LED) or any other suitable light source. The optical device 1300 further includes a first optical element to collect and collimate light rays from the light source 1302. For example, the first optical element may be an imaging lens. The optical device 1300 also further includes a pair of optical elements 1306 for focusing the light rays. For example, each of the optical elements 1306 can be any suitable lens or lens array, such as a fly's eye lens, a Fresnel lens, a diffractive lens, a microlens array, or any other suitable lens. A fly's eye lens, as used herein, refers to a two dimensional array of individual optical elements assembled or formed into a single optical element and used to spatially transform light from a nonuniform distribution to a uniform irradiance distribution at an illumination plane. The optical device 1300 further includes pair of lens switching apparatuses 1308 to switch each optical element 1306 between two or more optical states. For example, the lens switching apparatus 1308 may be any of the lens switching apparatuses described above in FIGS. 1-10. An object 1310 is illuminated by the light rays from the optical device 1300. For example, the object 1310 may be an object to be illuminated to be captured by an imaging device or a surface to have an image projected thereon. In addition, one of the light rays 1312 is bent at a different angle than the other light rays.

In the example of FIG. 13, one or more of the lens switching apparatuses 1308 may be used to switch one or more of the optical elements 1306 of the optical device 1300 between two or more states. For example, an on-off function can be created between two states of focused light beams. A first state can be focused on narrow field of view (FOV). For example, the narrower field of view focus can be used to illuminate distant objects because light intensity is the square of the zoom ratio, which corresponds directly to the FOV ratio. A second state can be focused on a large FOV for close objects and for full FOV image capture of a camera. In some examples, the optical device 1300 could have first lens 1304 that performs collimation of light rays for either of the focus modes. A lens switching apparatus 1308 such as a micropump or an electrowetting apparatus can then switch the optical elements 1306 between a focused or large FOV state. In some examples, the optical device 1300 can include a second micropump or electrowetting apparatus 1308 to perform spatial control of light. A subset of the optical elements 1306 can be individually controlled via the second lens switching apparatus 1308. For example, if a target object is on a right side and center of a picture, the optical elements 1306 can be spatially directed from left side to the center and right side. This may result in one or more of the light rays 1312 being bent at a different angle than the other light rays to focus onto the target object.

In some examples, the first optical element 1304 may be included to collimate the light source 1302 because the light source 1302 may be a Lambertian source, such as an LED. As used herein, Lambertian refers to a state of having a constant brightness when viewed from different angles. For example, the directional uniformity of light from the light source 1302 may be very low and the angle of the light may be very wide. The first optical element 1304 can thus be used to focus the light and reduce the angle.

In some examples, the first optical element 1304 may be excluded and the optical elements 1306 can be used to collimate the light instead. For example, the optical device 1300 may be able to switch between two states including a Lambertian state and a focused light state.

The diagram of FIG. 13 is not intended to indicate that the example optical device 1300 is to include all of the components shown in FIG. 13. Rather, the example optical device 1300 can be implemented using fewer or additional components not illustrated in FIG. 13 (e.g., lenses, light sources, etc.).

Figure 14:
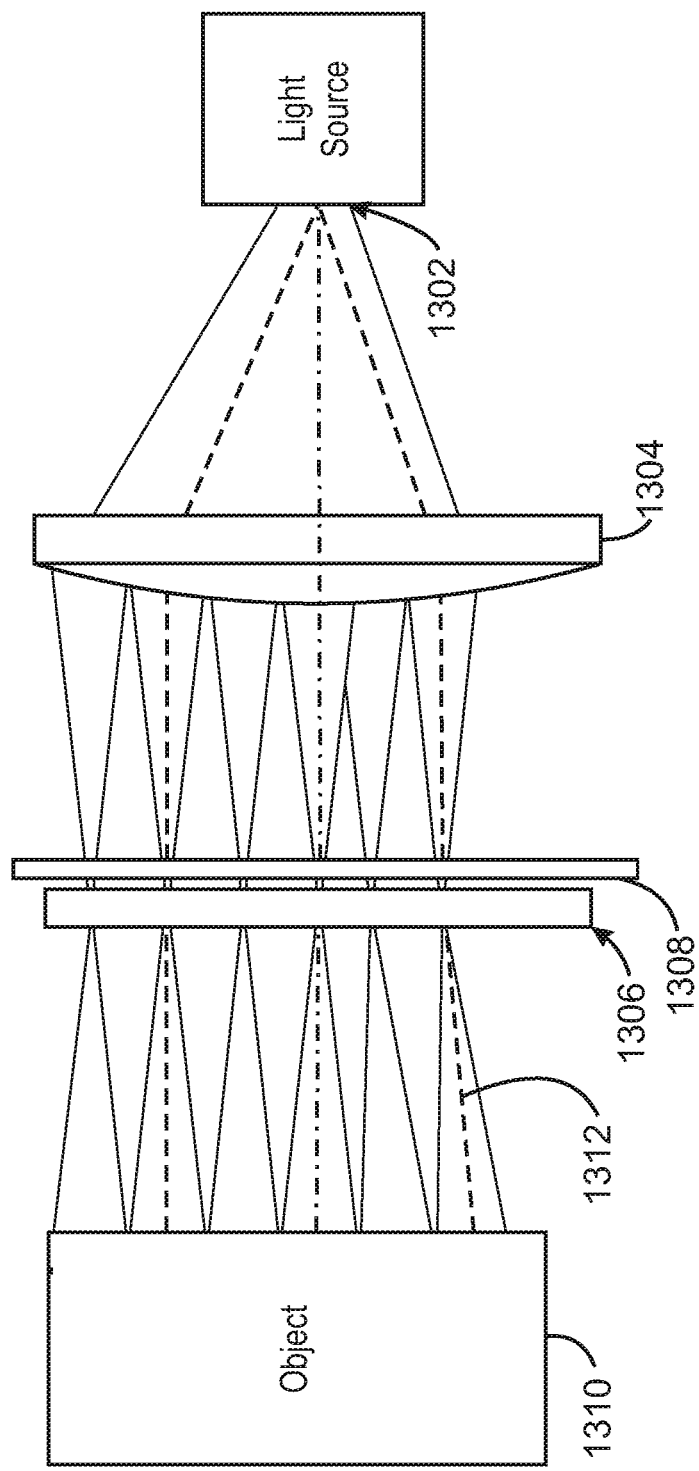
FIG. 14 is a flash with a single switching lens for illuminating an object.

FIG. 14 is an optical device with a single switching lens for illuminating an object. The example optical device is generally referred to by the reference number 1400 and can be implemented in the switching flash light 1528 of the electronic device 1500 below.

The example optical device 1400 includes the similarly numbered elements of FIG. 13 above. However, the optical device 1400 includes a single optical element 1306 for focusing light rays and an associated lens switching apparatus 1308. For example, the lens switching apparatus may be a micropump or an electrowetting apparatus.

In the example optical device 1400 of FIG. 14, a single optical element 1306 may perform the focusing of light. In combination with the lens switching apparatus 1308, the optical element 1306 may enable two states in the optical device 1400. For example, the optical states may include a focused state and an unfocused state.

The diagram of FIG. 14 is not intended to indicate that the example optical device 1400 is to include all of the components shown in FIG. 14. Rather, the example optical device 1400 can be implemented using fewer or additional components not illustrated in FIG. 14 (e.g., additional mirrors, slots, reflections, light sources, etc.).

Figure 15:
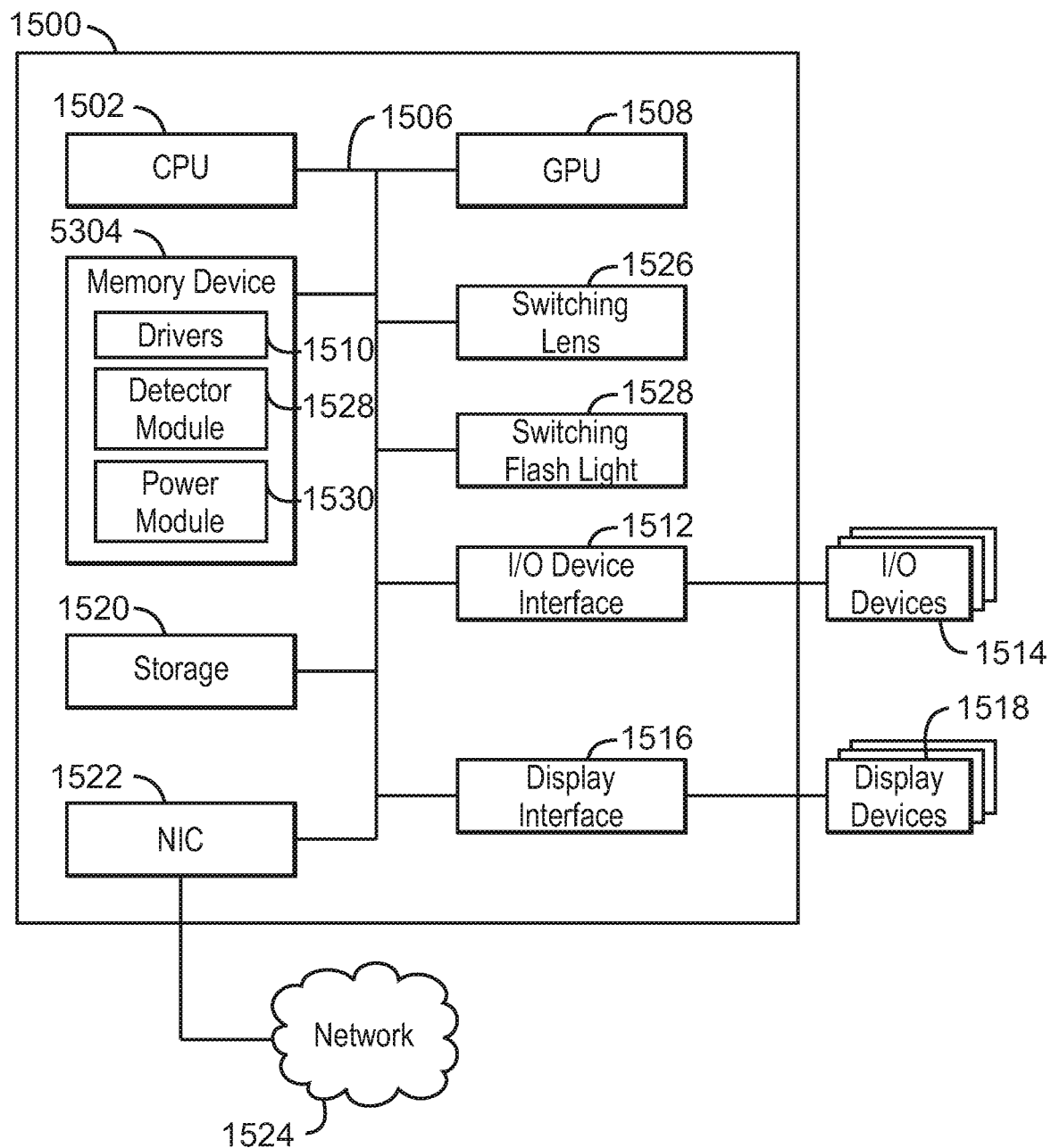
FIG. 15 is a block diagram illustrating an example imaging device with a switching lens.

Referring now to FIG. 15, a block diagram is shown illustrating an example electronic device with a switching lens. The electronic device 1500 may be, for example, a mobile device such as a laptop computer, desktop computer, tablet computer, mobile device, camera, or a wearable device, among others. In some examples, the electronic device 1500 may be a smartphone, smartwatch, electronic glasses, or electronic band. In some examples, the electronic device 1500 may be an optical device such as a projector. The electronic device 1500 may include a central processing unit (CPU) 1502 that is configured to execute stored instructions, as well as a memory device 1504 that stores instructions that are executable by the CPU 1502. The CPU 1502 may be coupled to the memory device 1504 by a bus 1506. Additionally, the CPU 1502 can be a single core processor, a multi-core processor, a computing cluster, or any number of other configurations. Furthermore, the electronic device 1500 may include more than one CPU 1502. In some examples, the CPU 1502 may be a system-on-chip (SoC) with a multi-core processor architecture. In some examples, the CPU 1502 can be a specialized digital signal processor (DSP) used for image processing. The memory device 1504 can include random access memory (RAM), read only memory (ROM), flash memory, or any other suitable memory systems. For example, the memory device 1504 may include dynamic random access memory (DRAM).

The memory device 1504 can include random access memory (RAM), read only memory (ROM), flash memory, or any other suitable memory systems. For example, the memory device 1504 may include dynamic random access memory (DRAM). The memory device 1504 may include device drivers 1510 that are configured to execute the instructions for switching microlenses between two or more states. The device drivers 1510 may be software, an application program, application code, or the like.

The electronic device 1500 may also include a graphics processing unit (GPU) 1508. As shown, the CPU 1502 may be coupled through the bus 1506 to the GPU 1508. The GPU 1508 may be configured to perform any number of graphics operations within the electronic device 1500. For example, the GPU 1508 may be configured to render or manipulate graphics images, graphics frames, videos, or the like, to be displayed to a user of the electronic device 1500.

The memory device 1504 can include random access memory (RAM), read only memory (ROM), flash memory, or any other suitable memory systems. For example, the memory device 1504 may include dynamic random access memory (DRAM). The memory device 1504 may include device drivers 1510 that are configured to execute instructions for switching microlenses. The device drivers 1510 may be software, an application program, application code, or the like.

The CPU 1502 may also be connected through the bus 1506 to an input/output (I/O) device interface 1512 configured to connect the electronic device 1500 to one or more I/O devices 1514. The I/O devices 1514 may include, for example, a keyboard and a pointing device, wherein the pointing device may include a touchpad or a touchscreen, among others. The I/O devices 1514 may be built-in components of the electronic device 1500, or may be devices that are externally connected to the electronic device 1500. In some examples, the memory 1504 may be communicatively coupled to I/O devices 1514 through direct memory access (DMA).

The CPU 1502 may also be linked through the bus 1506 to a display interface 1516 configured to connect the electronic device 1500 to a display device 1518. The display devices 1518 may include a display screen that is a built-in component of the electronic device 1500. The display devices 1518 may also include a computer monitor, television, or projector, among others, that is internal to or externally connected to the electronic device 1500.

The electronic device 1500 also includes a storage device 1520. The storage device 1520 is a physical memory such as a hard drive, an optical drive, a thumbdrive, an array of drives, a solid-state drive, or any combinations thereof. The storage device 1520 may also include remote storage drives.

The electronic device 1500 may also include a network interface controller (NIC) 1522. The NIC 1522 may be configured to connect the electronic device 1500 through the bus 1506 to a network 1524. The network 1524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The electronic device 1500 may also include a switching lens 1526 as discussed above. The switching lens 1526 may include a main lens to guide light towards a microlens as discussed in FIG. 11 above. The switching lens 1526 may also include a sensor to capture light information as discussed in FIG. 11 above. The switching lens 1526 may include any of the microlenses, microlens apparatuses, or electromagnetic apparatuses, described in FIGS. 1-12 above. In some examples, the switching lens 1526 may include a micropump. For example, the micropump may include a magnet and ferromagnetic fluid and a coil to pump a fluid that may have an optical index that matches the optical index of the microlens. In some examples, the switching lens 1526 may include an electrowetting apparatus. For example, the electrowetting apparatus may include an electrode to apply a voltage difference across water that may or may not have an optical index matching the optical index of one or more microlenses.

In some examples, the storage device 1520 may include a detector module 1528 and a power module 1530. In some examples, the detector module 1528 can detect an input to change the state of the switching lens 1526 from a plenoptic state to a conventional state. In some examples, the detector module 1528 can detect an input to change the state of the switching lens 1526 from a conventional state to a plenoptic state. For example, a plenoptic state may be used to capture light field information at a lower resolution. A conventional state may be used to capture images at higher resolution. In some examples, the power module 1530 may enable power to an apparatus within the switching lens 1526 to switch between a plenoptic state and a conventional state.

The block diagram of FIG. 15 is not intended to indicate that the electronic device 1500 is to include all of the components shown in FIG. 15. Rather, the electronic device 1500 can include fewer or additional components not illustrated in FIG. 15, such as additional lenses, additional processors, and the like. The electronic device 1500 may include any number of additional components not shown in FIG. 15, depending on the details of the specific implementation. Furthermore, any of the functionalities of the CPU 1502 may be partially, or entirely, implemented in hardware and/or in a processor.

Figure 16:
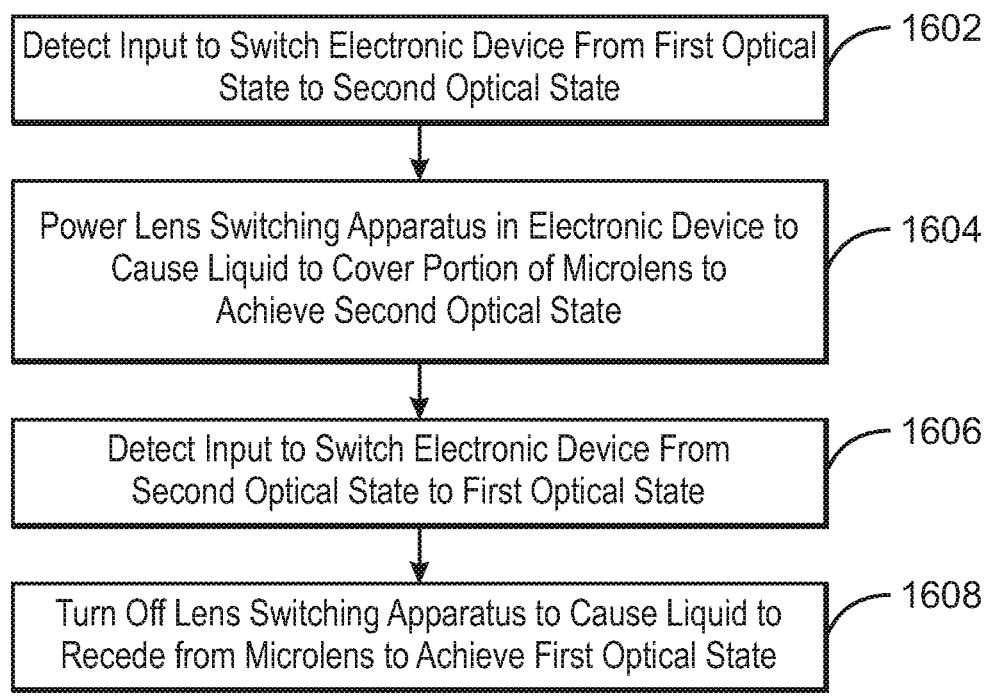
FIG. 16 is a flow chart illustrating a method for electronically switching microlenses using a lens switching apparatus.

FIG. 16 is a flow chart illustrating a method for switching lenses using a lens switching apparatus. The example method is generally referred to by the reference number 1600 and can be implemented using the electronic device 1500 of FIG. 15. For example, the method can be performed by processor and/or the switching lens of the electronic device 1500 above.

At block 1602, the processor detects an input to switch the electronic device from a first optical state to a second optical state. For example, the first optical state may be a conventional state and the second optical state may be a plenoptic state. In some examples, the plenoptic state may be used to capture light field information.

At block 1604, the processor powers a lens switching apparatus to cause a liquid to cover a portion of a microlens to achieve the second optical state. The liquid may have an optical index that matches an optical index of the microlens. For example, the microlens apparatus may be a micropump. For example, the micropump may cause a magnet to displace the liquid by pressing against a reservoir containing the liquid. In some examples, the micropump may cause a ferrofluid to displace the liquid by pressing against a reservoir containing the liquid. In some examples, the microlens apparatus may be an electrowetting apparatus coupled to the microlens. For example, the electrowetting apparatus may cause the liquid to be electrowetted. In some examples, electrowetting the liquid may cause an oil to be displaced from beneath the microlens. In some examples, the microlens apparatus may be any of the microlens apparatuses described in FIGS. 1-12 above.

At block 1606, the processor detects an input to switch the electronic device from the second optical state to the first optical state. For example, the input may be requesting a switch from a plenoptic state to a convention state to take high resolution pictures.

At block 1608, the processor turns off the lens switching apparatus to cause the liquid to recede from the microlens to achieve the first optical state. For example, a micropump may be used to remove liquid from under one or more microlenses. In some examples, the wetting properties of the liquid may be modified and thus cause the oil to enter into a chamber beneath the one or more microlenses.

This process flow diagram is not intended to indicate that the blocks of the example process 1600 are to be executed in any particular order, or that all of the blocks are to be included in every case. Further, any number of additional blocks not shown may be included within the example process 1600, depending on the details of the specific implementation.

Figure 17:
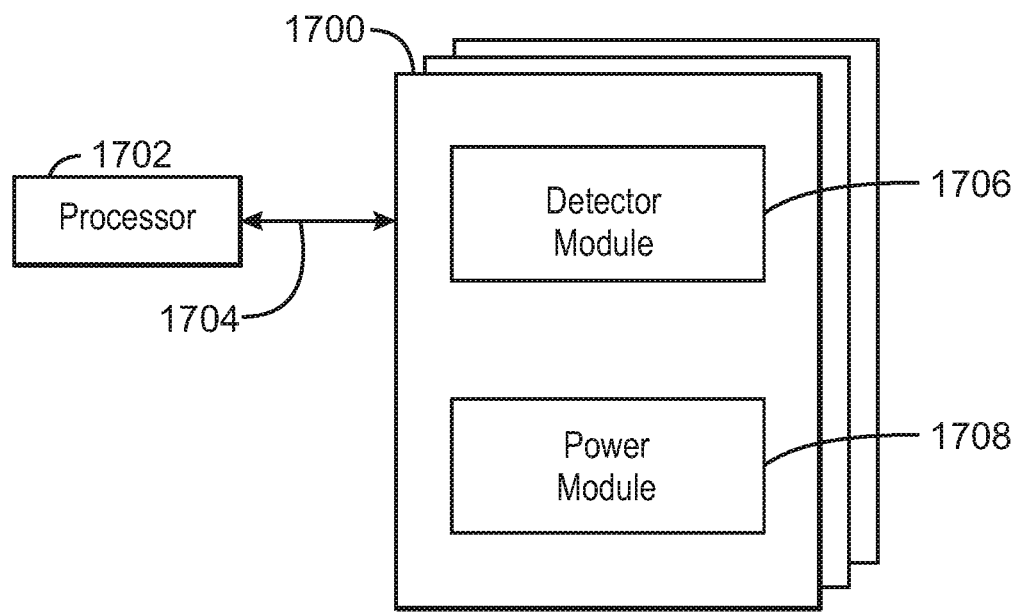
FIG. 17 is a block diagram showing computer readable media that store code for electronically switching microlenses.

FIG. 17 is a block diagram showing computer readable media 1700 that store code for electronically switching microlenses. The computer readable media 1700 may be accessed by a processor 1702 over a computer bus 1704. Furthermore, the computer readable medium 1700 may include code configured to direct the processor 1702 to perform the methods described herein. In some embodiments, the computer readable media 1700 may be non-transitory computer readable media. In some examples, the computer readable media 1700 may be storage media. However, in any case, the computer readable media do not include transitory media such as carrier waves, signals, and the like.

The various software components discussed herein may be stored on one or more computer readable media 1700, as indicated in FIG. 17. For example, a detector module 1706 may be configured to detect an input to switch a switching lens from a first optical state to a second optical state. For example, the detector module 1706 may be configured to detect an input to switch the switching lens from a plenoptic state to a conventional optic state or from a conventional optic state to a plenoptic state. For example, the power module 1708 may include instructions to cause a magnet to displace a liquid in the lens switching apparatus by pressing against a reservoir containing the liquid. In some examples, the modification to the current in the electromagnetic coil may cause a magnet or ferrofluid to displace a fluid to or from a chamber adjacent to the microlens. For example, the fluid may have an optical index equivalent to the optical index of the microlens. In some examples, the power module 1708 may include instructions to cause a ferrofluid in the lens switching apparatus to displace a liquid in the lens switching apparatus by pressing against a reservoir containing the liquid.

In some examples, the detector module 1706 may include instructions to detect an input to switch the electronic device from the second optical state to the first optical state. A power module 1706 may include instructions to modify current in a lens switching apparatus in response to detecting the input. For example, the power module 1706 may include instructions to modify current in an electromagnetic coil based on the first optical state and the second optical state. For example, the power module 1708 may include instructions to switch a direction of the current in the electromagnetic coil. In some examples, the power module 1708 may include instructions to turn off the lens switching apparatus to cause the liquid to recede from the microlens to achieve the first optical state. For example, the power module 1708 may include instructions to remove power from an electromagnetic coil such that no current flows through the electromagnetic coil.

In some examples, the power module 1708 may also include instructions to provide a charge to the fluid to cause a fluid to be electrowetted. For example, water may be electrowetted via an electrowetting apparatus in the switching lens. In some examples, the electrowetting apparatus may include an electrode to apply an electric field to a fluid that may or may not have an optical index matching the optical index of one or more microlenses. For example, the power module 1708 may include instructions to modify a voltage potential at a transparent electrode to cause a liquid in the lens switching apparatus to be electrowetted. In some examples, the power module 1708 may include instructions to cause an oil to be displaced from beneath a microlens by providing current to the lens switching apparatus. The lens switching apparatus may be an electrowetting apparatus. In some examples, the power module 1708 may include instructions to modify the wetting properties of the liquid by providing current to the lens switching apparatus to cause oil to enter into a chamber beneath a microlens.

In some examples, the power module 1708 may include instructions to capture high resolution images in the first optical state. In some examples, the power module 1708 may include instructions to capture light field information in the second optical state. For example, the light field information may be used to generate plenoptic images.

The block diagram of FIG. 17 is not intended to indicate that the computer readable media 1700 is to include all of the components shown in FIG. 17. Further, the computer readable media 1700 may include any number of additional components not shown in FIG. 17, depending on the details of the specific implementation.

EXAMPLES

Example 1 is an electronic apparatus for switching microlenses. The apparatus includes a microlens including a plurality of microstructures to bend light. The apparatus also includes a chamber coupled to the microlens to receive a liquid with an optical index that matches an optical index of the microlens. The apparatus further includes an electronic device coupled to the chamber to manipulate the liquid to achieve a target optical state of the microlens.

Example 2 includes the apparatus of example 1, including or excluding optional features. In this example, the apparatus includes a capillary pump coupled to the chamber to prevent liquid from escaping the chamber.

Example 3 includes the apparatus of any one of examples 1 to 2, including or excluding optional features. In this example, the liquid is a water having an optical index matching an optical index of the microlens.

Example 4 includes the apparatus of any one of examples 1 to 3, including or excluding optional features. In this example, the electronic device includes a micropump including a reservoir to contain the fluid, a magnet contained inside a ferrofluid adjacent to the reservoir, and an electromagnetic coil, wherein the magnet is to squeeze against the reservoir in response to a current being driven at the electromagnetic coil.

Example 5 includes the apparatus of any one of examples 1 to 4, including or excluding optional features. In this example, the electronic device includes a micropump including a magnet surrounded by a plurality of side coils, wherein the magnet is to compress a reservoir of the liquid in response to magnetic forces generated by the side coils being powered.

Example 6 includes the apparatus of any one of examples 1 to 5, including or excluding optional features. In this example, the electronic device includes a micropump including a ferrofluid between a reservoir including the fluid and an electromagnetic coil adjacent to a fixed magnet, wherein the ferrofluid is to compress the reservoir without power at the electromagnetic coil and recede from the reservoir when the electromagnetic coil is powered.

Example 7 includes the apparatus of any one of examples 1 to 6, including or excluding optional features. In this example, the electronic device includes an electrowetting apparatus including a hydrophobic insulator and a transparent electrode to apply a voltage difference across the hydrophobic insulator to change wetting properties of a water to displace an oil.

Example 8 includes the apparatus of any one of examples 1 to 7, including or excluding optional features. In this example, the microstructures include diffractive microstructures.

Example 9 includes the apparatus of any one of examples 1 to 8, including or excluding optional features. In this example, the microstructures include refractive microstructures.

Example 10 includes the apparatus of any one of examples 1 to 9, including or excluding optional features. In this example, the microlens is a printed Fresnel lens.

Example 11 is a method for switching an electronic device between two optical states. The method includes detecting an input to switch the electronic device from a first optical state to a second optical state. The method includes powering a lens switching apparatus in the electronic device to cause a liquid to cover a portion of a microlens to achieve the second optical state. The liquid has an optical index that matches an optical index of the microlens.

Example 12 includes the method of example 11, including or excluding optional features. In this example, the method includes detecting an input to switch the electronic device from the second optical state to the first optical state; and turning off the lens switching apparatus to cause the liquid to recede from the microlens to achieve the first optical state.

Example 13 includes the method of any one of examples 11 to 12, including or excluding optional features. In this example, the method includes capturing high resolution images in the first optical state, wherein the first optical state is a conventional state.

Example 14 includes the method of any one of examples 11 to 13, including or excluding optional features. In this example, the method includes capturing light field information in the second optical state, wherein the second optical state is a plenoptic state.

Example 15 includes the method of any one of examples 11 to 14, including or excluding optional features. In this example, the lens switching apparatus includes a micropump or a microwetting apparatus.

Example 16 includes the method of any one of examples 11 to 15, including or excluding optional features. In this example, powering the lens switching apparatus is to further cause a magnet to displace the liquid by pressing against a reservoir containing the liquid.

Example 17 includes the method of any one of examples 11 to 16, including or excluding optional features. In this example, powering the lens switching apparatus is to further cause the liquid to be electrowetted.

Example 18 includes the method of any one of examples 11 to 17, including or excluding optional features. In this example, powering the lens switching apparatus is to further cause a ferrofluid to displace the liquid by pressing against a reservoir containing the liquid.

Example 19 includes the method of any one of examples 11 to 18, including or excluding optional features. In this example, powering the lens switching apparatus is to further cause an oil to be displaced from beneath the microlens.

Example 20 includes the method of any one of examples 11 to 19, including or excluding optional features. In this example, turning off the lens switching apparatus further includes modifying the wetting properties of the liquid causing oil to enter into a chamber beneath the microlens.

Example 21 is an imaging device for plenoptic photography. The device includes a sensor to capture light information. The device also includes a main lens to guide light towards a microlens. The device further includes a microlens including a plurality of microstructures to bend light towards the sensor. The device also further includes a chamber coupled to the microlens to receive a liquid with an optical index that matches an optical index of the microlens. The device further includes an electronic device coupled to the chamber to manipulate the liquid to achieve a target optical state of the microlens.

Example 22 includes the device of example 21, including or excluding optional features. In this example, the microlens is a printed Fresnel lens.

Example 23 includes the device of any one of examples 21 to 22, including or excluding optional features. In this example, the liquid is water having an optical index matching an optical index of the microlens.

Example 24 includes the device of any one of examples 21 to 23, including or excluding optional features. In this example, the electronic device includes a micropump coupled to a reservoir containing the liquid.

Example 25 includes the device of any one of examples 21 to 24, including or excluding optional features. In this example, the electronic device includes an electrowetting apparatus coupled to the chamber.

Example 26 includes the device of any one of examples 21 to 25, including or excluding optional features. In this example, the electronic device includes a ferrofluid to press against a reservoir containing the fluid.

Example 27 includes the device of any one of examples 21 to 26, including or excluding optional features. In this example, the electronic device includes a magnet to press against a reservoir containing the fluid.

Example 28 includes the device of any one of examples 21 to 27, including or excluding optional features. In this example, the microlens is a diffractive lens.

Example 29 includes the device of any one of examples 21 to 28, including or excluding optional features. In this example, the microlens is a microlens array.

Example 30 includes the device of any one of examples 21 to 29, including or excluding optional features. In this example, the microlens is a printed Fresnel lens.

Example 31 is an electronic device. The electronic device includes a light source to illuminate a target object. The electronic device includes a microlens coupled to the light source. The microlens includes a plurality of microstructures to bend light. The electronic device includes a chamber coupled to the microlens to receive a liquid with an optical index that matches an optical index of the microlens. The electronic device includes a lens switching device coupled to the chamber to manipulate the liquid to achieve a target state of the electronic device.

Example 32 includes the electronic device of example 31, including or excluding optional features. In this example, the electronic device includes an optical element to collimate light from the light source onto the microlens.

Example 33 includes the electronic device of any one of examples 31 to 32, including or excluding optional features. In this example, the microlens is one of a pair of microlenses to focus light onto the target object.

Example 34 includes the electronic device of any one of examples 31 to 33, including or excluding optional features. In this example, the lens switching device includes a micropump coupled to a reservoir containing the liquid.

Example 35 includes the electronic device of any one of examples 31 to 34, including or excluding optional features. In this example, the lens switching device includes an electrowetting apparatus.

Example 36 includes the electronic device of any one of examples 31 to 35, including or excluding optional features. In this example, the light source includes a light emitting diode (LED).

Example 37 includes the electronic device of any one of examples 31 to 36, including or excluding optional features. In this example, the electronic device is a flash light.

Example 38 includes the electronic device of any one of examples 31 to 37, including or excluding optional features. In this example, the electronic device is a projector.

Example 39 includes the electronic device of any one of examples 31 to 38, including or excluding optional features. In this example, the target object is an object to be captured by the electronic device and the electronic device is an imaging device.

Example 40 includes the electronic device of any one of examples 31 to 39, including or excluding optional features. In this example, the target object is a screen to have an image projected thereon.

Example 41 is at least one computer readable medium for switching lenses electronically having instructions stored therein that direct the processor to detect an input to switch a switching lens from a first optical state to a second optical state. The computer-readable medium further includes instructions to modify a current in a lens switching apparatus in response to detecting the input.

Example 42 includes the computer-readable medium of example 41, including or excluding optional features. In this example, the computer-readable medium includes instructions to detect an input to switch the electronic device from the second optical state to the first optical state. The computer-readable medium also includes instructions to turn off the lens switching apparatus to cause the liquid to recede from the microlens to achieve the first optical state.

Example 43 includes the computer-readable medium of any one of examples 41 to 42, including or excluding optional features. In this example, the computer-readable medium includes instructions to modify a current in an electromagnetic coil of the lens switching apparatus based on the first optical state and the second optical state.

Example 44 includes the computer-readable medium of any one of examples 41 to 43, including or excluding optional features. In this example, the computer-readable medium includes instructions to cause a magnet to displace a liquid in the lens switching apparatus by pressing against a reservoir containing the liquid.

Example 45 includes the computer-readable medium of any one of examples 41 to 44, including or excluding optional features. In this example, the computer-readable medium includes instructions to modify a voltage potential at a transparent electrode to cause a liquid in the lens switching apparatus to be electrowetted.

Example 46 includes the computer-readable medium of any one of examples 41 to 45, including or excluding optional features. In this example, the computer-readable medium includes instructions to cause a ferrofluid in the lens switching apparatus to displace a liquid in the lens switching apparatus by pressing against a reservoir containing the liquid.

Example 47 includes the computer-readable medium of any one of examples 41 to 46, including or excluding optional features. In this example, the computer-readable medium includes instructions to cause an oil to be displaced from beneath a microlens by providing current to the lens switching apparatus, wherein the lens switching apparatus includes an electrowetting apparatus.

Example 48 includes the computer-readable medium of any one of examples 41 to 47, including or excluding optional features. In this example, the computer-readable medium includes instructions to modify the wetting properties of the liquid by providing current to the lens switching apparatus to cause oil to enter into a chamber beneath a microlens.

Example 49 includes the computer-readable medium of any one of examples 41 to 48, including or excluding optional features. In this example, the computer-readable medium includes instructions to capture high resolution images in the first optical state.

Example 50 includes the computer-readable medium of any one of examples 41 to 49, including or excluding optional features. In this example, the computer-readable medium includes instructions to capture light field information in the second optical state.

Example 51 is a system for switching microlenses. The system includes means for bending light. The system also includes means for receiving a liquid with an optical index that matches an optical index of the microlens. The system further includes means for manipulating the liquid to achieve a target optical state of the microlens.

Example 52 includes the system of example 51, including or excluding optional features. In this example, the system includes means for preventing the liquid from escaping the means for receiving the liquid.

Example 53 includes the system of any one of examples 51 to 52, including or excluding optional features. In this example, the liquid is water having an optical index matching an optical index of the means for bending light.

Example 54 includes the system of any one of examples 51 to 53, including or excluding optional features. In this example, the electronic device includes means for containing the fluid, a means for displacing the fluid by squeezing against the means for containing the fluid in response to a current being driven at a means for controlling the means for displacing the fluid.

Example 55 includes the system of any one of examples 51 to 54, including or excluding optional features. In this example, the means for displacing the fluid includes a micropump including a magnet surrounded by a plurality of side coils, wherein the magnet is to compress a reservoir of the liquid in response to magnetic forces generated by the side coils being powered.

Example 56 includes the system of any one of examples 51 to 55, including or excluding optional features. In this example, the means for displacing the fluid includes a micropump including a ferrofluid between a reservoir including the fluid and an electromagnetic coil adjacent to a fixed magnet, wherein the ferrofluid is to compress the reservoir without power at the electromagnetic coil and recede from the reservoir when the electromagnetic coil is powered.

Example 57 includes the system of any one of examples 51 to 56, including or excluding optional features. In this example, the means for displacing the fluid includes an electrowetting apparatus including a hydrophobic insulator and a transparent electrode to apply a voltage difference across the hydrophobic insulator to change wetting properties of a water to displace an oil.

Example 58 includes the system of any one of examples 51 to 57, including or excluding optional features. In this example, the means for bending light includes diffractive microstructures.

Example 59 includes the system of any one of examples 51 to 58, including or excluding optional features. In this example, the means for bending light includes refractive microstructures.

Example 60 includes the system of any one of examples 51 to 59, including or excluding optional features. In this example, the means for bending light includes a microlens including a printed Fresnel lens.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic apparatus for switching image states of a microlens, comprising:
   the microlens comprising a plurality of microstructures to bend light;
   a chamber coupled to the microlens to receive a liquid with an optical index that matches an optical index of the microlens; and
   an electronic device coupled to the chamber to manipulate the liquid to achieve a target optical state of the microlens, wherein the electronic device comprises a micropump comprising a reservoir to contain the liquid, a magnet contained inside a ferrofluid adjacent to the reservoir, and an electromagnetic coil, wherein the magnet is to squeeze against the reservoir in response to a current being driven at the electromagnetic coil.

2. The electronic apparatus of claim 1, further comprising a capillary pump coupled to the chamber to prevent liquid from escaping the chamber.

3. The electronic apparatus of claim 1, wherein the liquid comprises water comprising the optical index matching the optical index of the microlens.

4. The electronic apparatus of claim 1, wherein the microstructures comprise diffractive microstructures.

5. The electronic apparatus of claim 1, wherein the microstructures comprise refractive microstructures.

6. The electronic apparatus of claim 1, wherein the microlens is a printed Fresnel lens.

7. A method for switching an electronic device between two optical states, comprising:
- detecting an input to switch the electronic device from a first optical state to a second optical state; and
- powering a microlens apparatus in the electronic device to cause a liquid at a chamber coupled to a microlens to cover a portion of the microlens to achieve the second optical state, wherein the liquid comprises an optical index that matches an optical index of the microlens, wherein the microlens comprises a plurality of microstructures to bend light, wherein the microlens apparatus comprises a micropump coupled to the chamber to manipulate the liquid to achieve a target optical state of the microlens, wherein the micropump comprises a magnet surrounded by a plurality of side coils and a reservoir to contain the liquid, wherein the magnet is to compress the reservoir of the liquid in response to magnetic forces generated by the side coils being powered.

8. The method of claim 7, further comprising:
- detecting an input to switch the electronic device from the second optical state to the first optical state; and
- turning off the microlens apparatus to cause the liquid to recede from the microlens to achieve the first optical state.

9. The method of claim 7, further comprising capturing high resolution images in the first optical state, wherein the first optical state is a conventional state.

10. The method of claim 7, further comprising capturing light field information in the second optical state, wherein the second optical state comprises a plenoptic state.

11. An imaging device for plenoptic photography, comprising:
- a sensor to capture light information;
- a main lens to guide light towards a microlens;
- the microlens comprising a plurality of microstructures to bend light towards the sensor;
- a chamber coupled to the microlens to receive a liquid with an optical index that matches an optical index of the microlens; and
- an electronic device coupled to the chamber to manipulate the liquid to achieve a target optical state of the microlens, wherein the electronic device comprises a micropump coupled to the chamber to manipulate the liquid to achieve the target optical state of the microlens, wherein the micropump comprises a magnet surrounded by a plurality of side coils and a reservoir to contain the liquid, wherein the magnet is to compress the reservoir of the liquid in response to magnetic forces generated by the side coils being powered.

12. The imaging device of claim 11, wherein the microlens comprises a printed Fresnel lens.

13. The imaging device of claim 11, wherein the liquid comprises water comprising the optical index matching the optical index of the microlens.

14. An electronic device, comprising:
- a light source to illuminate a target object;
- a microlens coupled to the light source, the microlens comprising a plurality of microstructures to bend light;
- a chamber coupled to the microlens to receive a liquid with an optical index that matches an optical index of the microlens; and
- a lens switching device coupled to the chamber to manipulate the liquid to achieve a target state of the electronic device, wherein the lens switching device comprises a micropump comprising a ferrofluid between a reservoir comprising the liquid and an electromagnetic coil adjacent to a fixed magnet, wherein the ferrofluid is to compress the reservoir without power at the electromagnetic coil and recede from the reservoir when the electromagnetic coil is powered.

15. The electronic device of claim 14, wherein the electronic device comprises a flash light.

16. The electronic device of claim 14, wherein the electronic device comprises a projector.

* * * * *